United States Patent
Hazzard et al.

(10) Patent No.: US 10,851,911 B2
(45) Date of Patent: Dec. 1, 2020

(54) VALVE ACTUATOR WITH EXTERNAL COILS

(71) Applicant: Ademco Inc., Golden Valley, MN (US)

(72) Inventors: Frederick Hazzard, Plymouth, MN (US); Gregory Young, Blaine, MN (US); Adam Myre, Minnetonka, MN (US); James Buezis, Plymouth, MN (US); Cailen Giese, St. Paul, MN (US)

(73) Assignee: Ademco Inc., Golden Valley, MN (US)

( * ) Notice: Subject to any disclaimer, the term of this patent is extended or adjusted under 35 U.S.C. 154(b) by 101 days.

(21) Appl. No.: 16/120,256

(22) Filed: Sep. 1, 2018

(65) Prior Publication Data

US 2020/0072378 A1    Mar. 5, 2020

(51) Int. Cl.
 *F16K 31/40*    (2006.01)

(52) U.S. Cl.
 CPC .......... *F16K 31/408* (2013.01); *F16K 31/402* (2013.01)

(58) Field of Classification Search
 CPC ....... F16K 31/02; F16K 31/402; F16K 31/408
 USPC ................................ 137/613, 487.5
 See application file for complete search history.

(56) References Cited

U.S. PATENT DOCUMENTS

| | | | |
|---|---|---|---|
| 2,009,193 A | 7/1935 | Hegwein et al. | |
| 2,268,959 A | 1/1942 | Ray | |
| 2,390,192 A | 12/1945 | St. Clair | |
| 2,411,230 A | 11/1946 | Ray | |
| 2,437,894 A | 3/1948 | Ray | |
| 2,442,145 A | 5/1948 | Ray | |
| 2,446,718 A | 8/1948 | Ray | |
| 2,456,147 A | 12/1948 | Ray | |
| 2,494,833 A | 1/1950 | Ray | |
| 2,512,173 A | 6/1950 | Ray | |
| 2,529,740 A | 11/1950 | Ray | |
| 2,533,625 A | 12/1950 | Ray | |
| 2,601,321 A | 6/1952 | Ray | |
| 2,615,511 A | 10/1952 | Ray | |
| 2,652,109 A | 9/1953 | Ray | |
| 2,753,931 A | 7/1956 | Ray | |

(Continued)

FOREIGN PATENT DOCUMENTS

EP    1170549 B1    11/2006

OTHER PUBLICATIONS

Prosecution History from U.S. Appl. No. 15/717,608, dated Jan. 10, 2019 through Jul. 31, 2019, 26 pp.

(Continued)

*Primary Examiner* — Kevin L Lee
(74) *Attorney, Agent, or Firm* — Shumaker & Sieffert, P.A.

(57) ABSTRACT

A gas valve having a gas valve body having a valve and a valve seat both housed by the gas valve body. The valve may further include an armature housed by the gas valve body, a pole situated outside of the gas valve body so as to not be exposed to gas in the gas valve body. The pole may be positioned to be in magnetic communication with at least part of the armature through the gas valve body. The valve may further include a coil situated outside the gas valve body. The coil may be wound about the pole such that activation of the coil produces a magnetic flux that is carried to an end of the pole, through the gas valve body, and to the armature, resulting in movement of the armature, and movement of the valve between the open position and the closed position.

20 Claims, 10 Drawing Sheets

(56) References Cited

U.S. PATENT DOCUMENTS

| | | | |
|---|---|---|---|
| 2,850,030 A | 9/1958 | Guelson | |
| 2,939,523 A | 6/1960 | Ray | |
| 3,151,660 A | 10/1964 | Evraets | |
| 3,360,198 A | 12/1967 | Katchka | |
| 3,373,765 A | 3/1968 | McCarty | |
| 3,414,010 A | 12/1968 | Sparrow | |
| 3,433,409 A | 3/1969 | Jackson et al. | |
| 3,552,430 A | 1/1971 | Love | |
| 3,592,225 A | 7/1971 | Graham et al. | |
| 3,666,173 A | 5/1972 | Ray | |
| 3,688,981 A | 5/1974 | Branson | |
| 3,809,313 A | 5/1974 | Branson | |
| 3,973,576 A | 8/1976 | Dietiker et al. | |
| 4,303,384 A | 12/1981 | Barnes | |
| 4,413,975 A | 11/1983 | Turner et al. | |
| 4,622,999 A | 11/1986 | Ray | |
| 4,624,632 A | 11/1986 | Barnes et al. | |
| 4,696,639 A | 9/1987 | Bohan, Jr. | |
| 4,813,448 A * | 3/1989 | Leiber | B60T 8/368 137/487.5 |
| 4,832,070 A | 5/1989 | James et al. | |
| 4,850,530 A | 7/1989 | Decker | |
| 5,203,688 A | 4/1993 | Dietiker | |
| 5,407,128 A | 4/1995 | Schultz | |
| 5,503,549 A | 4/1996 | Iasella | |
| 6,032,693 A | 3/2000 | Home | |
| 6,047,718 A * | 4/2000 | Konsky et al. | F16K 1/443 137/1 |
| 6,124,775 A * | 9/2000 | Linkner, Jr. | B60T 8/363 251/129.15 |
| 6,192,913 B1 | 2/2001 | Willey et al. | |
| 6,418,956 B1 | 7/2002 | Bloom | |
| 6,637,669 B2 | 10/2003 | Areso | |
| 6,705,342 B2 | 3/2004 | Santinanavat et al. | |
| 6,719,267 B2 * | 4/2004 | Torii et al. | B06T 8/363 137/596.17 |
| 6,932,101 B2 | 8/2005 | Home | |
| 7,011,110 B1 * | 3/2006 | Stark | F16K 1/44 137/601.14 |
| 7,025,084 B2 * | 4/2006 | Perry et al. | F02M 25/0809 123/519 |
| 7,066,203 B2 | 6/2006 | Baarda | |
| 7,222,639 B2 | 5/2007 | Bonne et al. | |
| 7,249,749 B2 | 7/2007 | Niwa et al. | |
| 7,252,502 B2 | 8/2007 | Munsterhuis | |
| 7,435,081 B2 | 10/2008 | Munsterhuis | |
| 7,523,762 B2 | 4/2009 | Buezis et al. | |
| 8,162,002 B2 | 4/2012 | Pavin et al. | |
| 8,479,759 B2 | 7/2013 | Benvenuto et al. | |
| 9,206,921 B1 | 12/2015 | Jansen et al. | |
| 9,620,274 B2 | 4/2017 | Nagel et al. | |
| 2004/0075070 A1 | 4/2004 | Munsterhuis | |
| 2004/0173600 A1 | 9/2004 | Munsterhuis et al. | |
| 2004/0176859 A1 | 9/2004 | Chian et al. | |
| 2004/0200530 A1 | 10/2004 | Dalton et al. | |
| 2005/0041437 A1 | 2/2005 | Chian et al. | |
| 2005/0161516 A1 | 7/2005 | Munsterhuis | |
| 2005/0161518 A1 | 7/2005 | Munsterhuis | |
| 2006/0137749 A1 | 6/2006 | Bonne et al. | |
| 2007/0221276 A1 | 9/2007 | Buezis et al. | |
| 2014/0007821 A1 | 1/2014 | Villalobos et al. | |
| 2018/0099648 A1 | 4/2018 | Won | |
| 2019/0093787 A1 | 3/2019 | Hazzard et al. | |

OTHER PUBLICATIONS

"SunOnn Storage Gas Water Heater," accessed from http://www.solarwaterheatingindia.comsunonn.html, printed Jul. 26, 2016, 2 pages.

* cited by examiner

VALVE ACTUATOR WITH EXTERNAL COILS

TECHNICAL FIELD

The disclosure relates generally to gas valve assemblies, and more particularly, to a valve actuator for use in a gas valve assembly.

BACKGROUND

In recent years the quality of fuel gas has become increasingly poor, particularly in warmer regions where drying the gas is not critical and where regulations do not require relatively high levels of gas purity. As a result, gas supplies have had increasing concentrations of hydrogen sulfide, which can be very corrosive. Solenoid coils used in gas valves in natural gas and propane are highly susceptible to corrosion from hydrogen sulfide, which reacts with copper to form copper sulfide, especially in the presence of moisture. Valve actuators or components thereof (e.g., solenoids, copper wires, connection points) which are located within and/or near a gas stream may degrade or break due to the corrosion. What would be desirable is an economical robust gas valve actuator that is resistant to corrosion due to hydrogen sulfide or other contaminants in a gas supply.

SUMMARY

The disclosure relates generally to gas valve assemblies, and more particularly, to a valve actuator for use in a gas valve assembly. An illustrative, but non-limiting example of the disclosure may be found in a gas valve having a gas valve body having an inlet port and an outlet port and a valve and a valve seat both housed by the gas valve body. The valve may be movable between a closed position where the valve is positioned against the valve seat and an open position where the valve is spaced away from the valve seat. The valve may further include an armature housed by the gas valve body, wherein the armature is secured to the valve, a pole situated outside of the gas valve body so as to not be exposed to gas in the gas valve body. The pole may be positioned to be in magnetic communication with at least part of the armature through the gas valve body. The valve may further include a coil situated outside the gas valve body so as to not be exposed to gas in the gas valve body. The coil may be wound about the pole such that activation of the coil produces a magnetic flux that is carried to an end of the pole, through the gas valve body, and to the armature, resulting in movement of the armature, and movement of the valve between the open position and the closed position.

In another example, a gas valve assembly may comprise a gas valve body having an inlet port and an outlet port, with a fluid path extending between the inlet port and the outlet port, a first valve seat situated in the fluid path between the inlet port and the outlet port, a first diaphragm valve configured to be responsive to one or more pneumatic pressures to move between a normally closed position where the first diaphragm valve is sealed against the first valve seat and an open position wherein the first diaphragm valve is pulled away from the first valve seat, and a servo valve that, when activated, controls the one or more pneumatic pressures to move the first diaphragm valve away from the first valve seat and to allow a flow of gas between the inlet port and the outlet port. The servo valve may include a servo valve and a servo valve seat both situated within an interior of the gas valve body, the servo valve is movable between a closed position where the servo valve is positioned against the servo valve seat and an open position where the servo valve is spaced away from the servo valve seat, and a pole and a coil both situated outside of the gas valve body so as to not be exposed to gas in the gas valve body, the coil is wound about the pole such that activation of the coil produces a magnetic flux in the pole that magnetically moves the servo valve in the gas valve body between the open position and the closed position.

In another example, a gas valve assembly may comprise a gas valve body having an inlet port and an outlet port, with a fluid path extending between the inlet port and the outlet port, the gas valve body including a non-magnetic cover, a first valve seat situated in the fluid path between the inlet port and the outlet port, a first diaphragm valve configured to be responsive to one or more pneumatic pressures to move between a normally closed position where the first diaphragm valve is sealed against the first valve seat and an open position wherein the first diaphragm valve is pulled away from the first valve seat, and a servo valve that, when activated, controls the one or more pneumatic pressures to move the first diaphragm valve away from the first valve seat and to allow a flow of gas between the inlet port and the outlet port. The servo valve may include a servo valve and a servo valve seat both situated within an interior of the gas valve body, the servo valve is movable between a closed position where the servo valve is positioned against the servo valve seat and an open position where the servo valve is spaced away from the servo valve seat, and a pole and a coil both situated outside of the gas valve body so as to not be exposed to gas in the gas valve body, the coil is wound about the pole such that activation of the coil produces a magnetic flux in the pole that applies a magnetic driving force to the servo valve in the gas valve body to drive the servo valve between the open position and the closed position.

The above summary of some embodiments is not intended to describe each disclosed embodiment or every implementation of the present disclosure. The Figures, and Detailed Description, which follow, more particularly exemplify these embodiments

BRIEF DESCRIPTION OF THE FIGURES

The following description should be read with reference to the drawings. The drawings, which are not necessarily to scale, depict selected embodiments and are not intended to limit the scope of the disclosure. The disclosure may be more completely understood in consideration of the following detailed description of various embodiments in connection with the accompanying drawings, in which.

Figure 1:
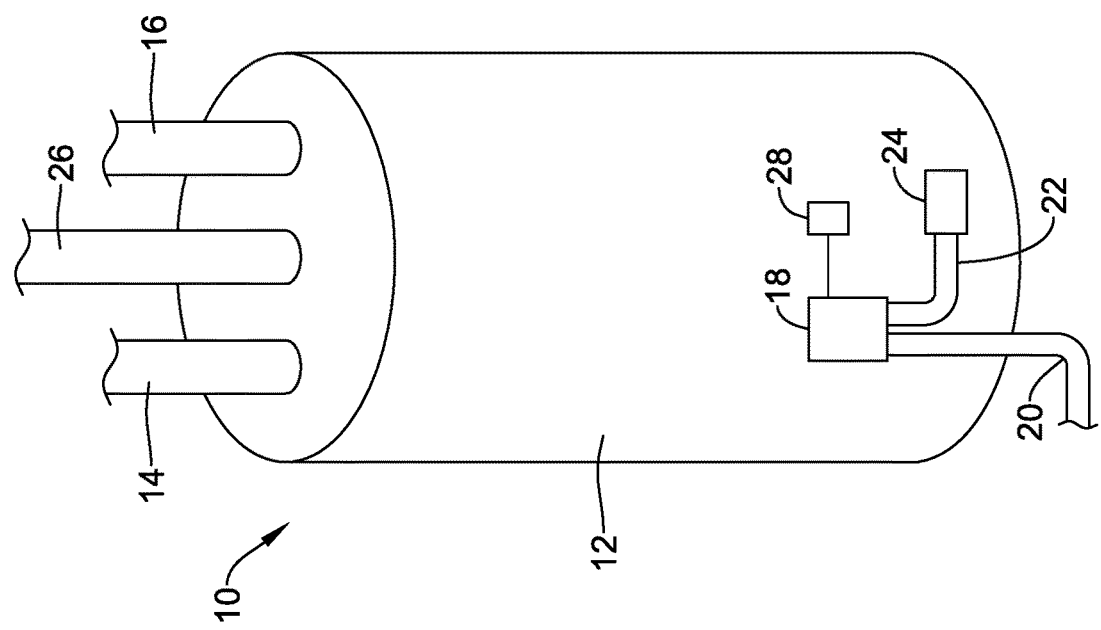
FIG. 1 is a schematic view of an illustrative but non-limiting water heater in accordance with the present disclosure.

While the disclosure is amenable to various modifications and alternative forms, specifics thereof have been shown by way of example in the drawings and will be described in detail. It should be understood, however, that the intention is not to limit the disclosure to the particular illustrative embodiments described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict selected embodiments and are not intended to limit the scope of the disclosure. Although examples of construction, dimensions, and materials are illustrated for the various elements, those skilled in the art will recognize that many of the examples provided have suitable alternatives that may be utilized.

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions ranges and/or values pertaining to various components, features and/or specifications are disclosed, one of skill in the art, incited by the present disclosure, would understand desired dimensions, ranges and/or values may deviate from those expressly disclosed.

FIG. 1 provides a schematic view of an illustrative but non-limiting water heater 10. While a water heater is described as one example application, it should be recognized that there are many other applications for the gas valves discussed below in subsequent Figures. For example, the gas valves discussed below may be used in other combustion appliance such as furnaces, boilers, gas dryers, and other combustion appliances. The gas valves discussed below may be used in industrial applications, such as in distillation towers and other process applications.

Turning to FIG. 1, the illustrative water heater 10 includes a water heater tank 12. The water heater tank 12 may include an insulating layer (not explicitly shown) positioned about the water heater tank 12 to help reduce thermal losses from the water heater tank 12. Cold water enters water heater tank 12 through a cold water line 14 and is heated by a gas burner 24. In some cases, the water heater 10 may include an electric heating element rather than a gas burner 24. A power delivery unit (not shown) may be used to selectively apply power (i.e. current) to the electric heating element. In either case, the resulting heated water exits through a hot water line 16. For gas-fired water heaters, a gas control unit 18, such as a gas valve, regulates gas flow from a gas source 20 through a combustion gas line 22 and into gas burner 24. A flue 26 permits combustion byproducts to safely exit.

Water heater 10 may include one or more temperature sensors 28. In some cases, a temperature sensor 28 may enter water heater tank 12 at a location laterally and/or vertically offset from gas control unit 18. In some instances, a temperature sensor 28 may instead be located behind gas control unit 18, and in some cases, may be supported and retained by a common mounting bracket. In some embodiments, a non-immersion type temperature sensor may be used.

Figure 2:
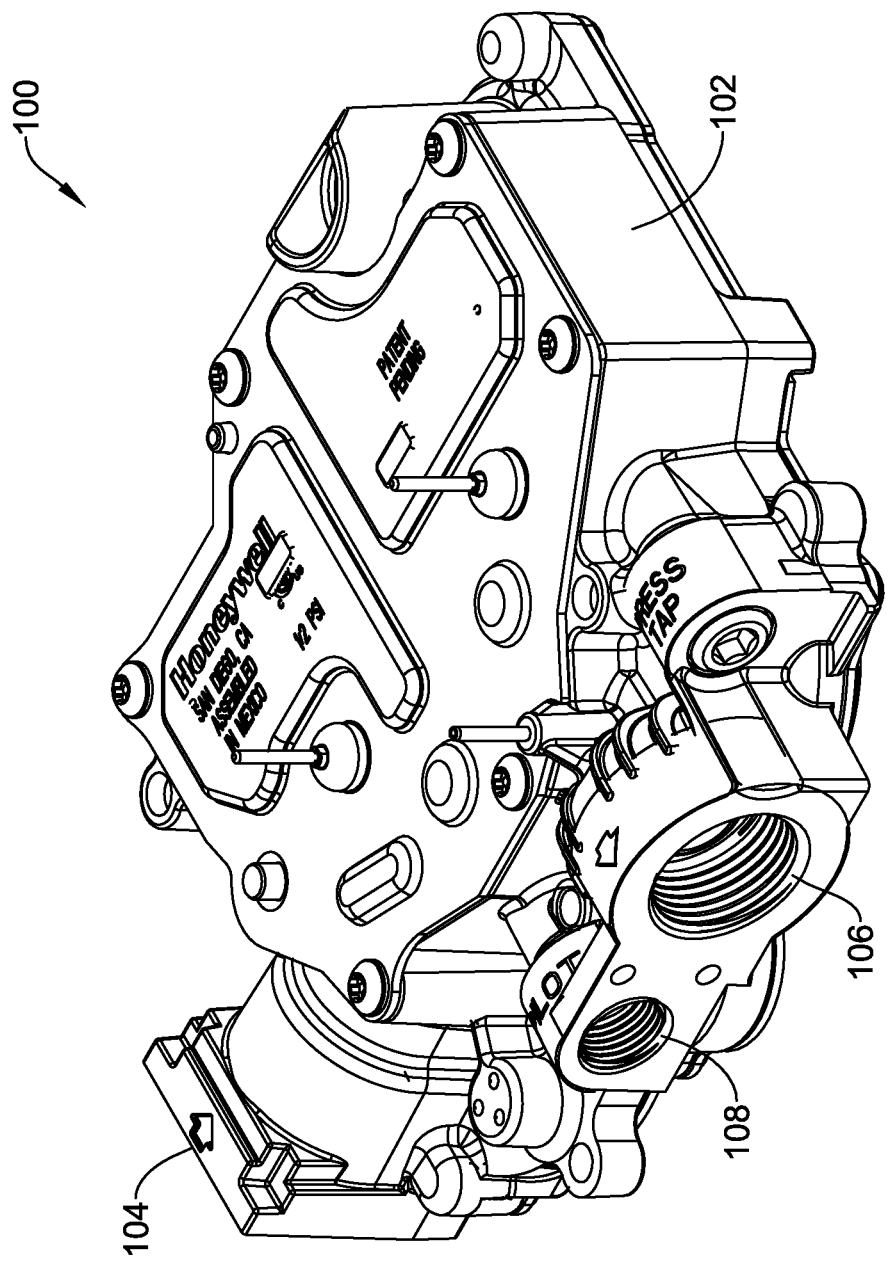
FIG. 2 is a perspective view of an illustrative but non-limiting gas valve.

FIG. 2 is a perspective view of an illustrative, but non-limiting gas valve 100. The illustrative gas valve 100 includes a valve body 102 that has a gas inlet 104, a gas outlet 106, a pilot gas outlet 108, and a conduit (see, for example, FIG. 3) connecting the gas inlet 104 to the gas outlet 106. The valve body 102 may be a single piece molded or cast structure sometimes with a removable cover, although this is not required.

Figure 3:
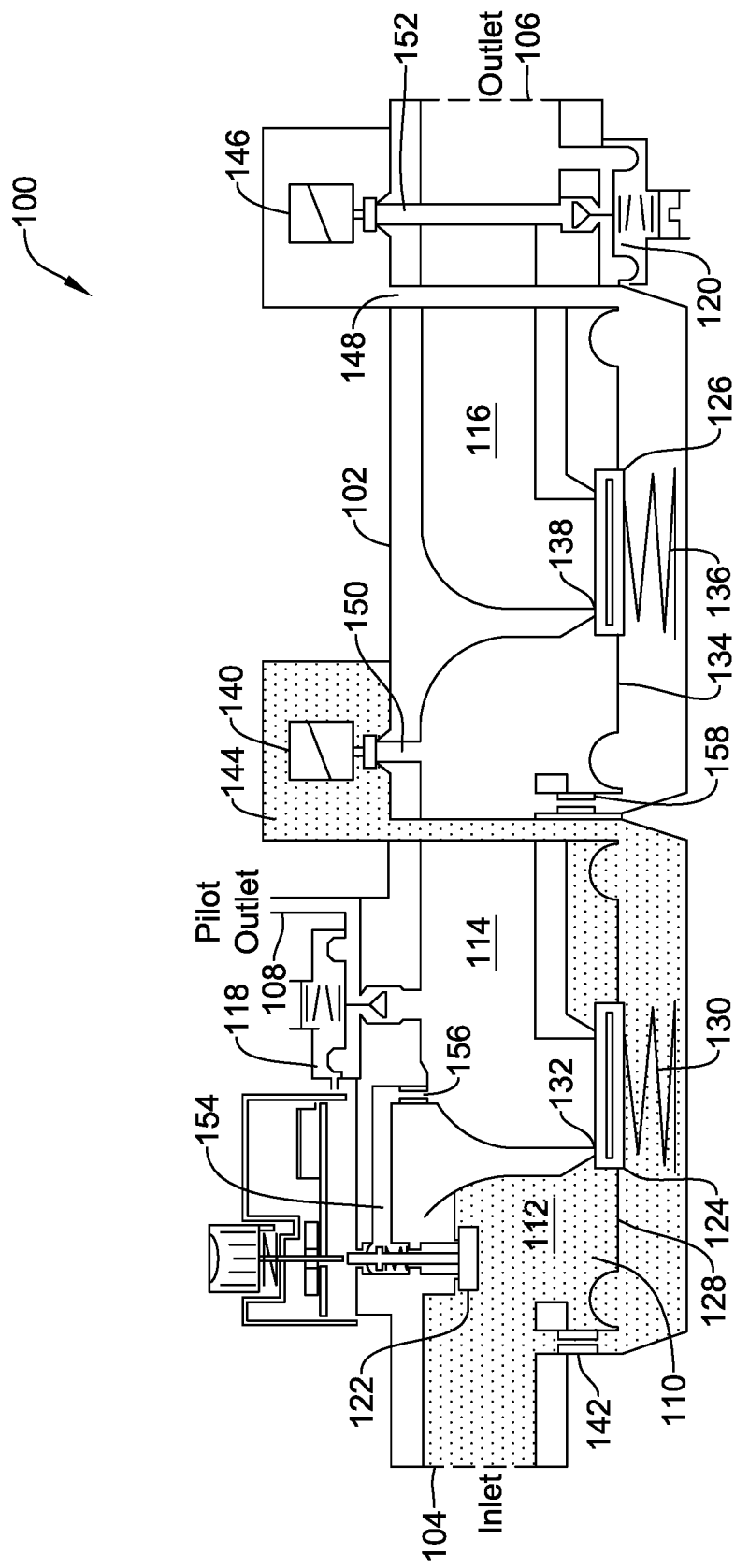
FIG. 3 is a schematic cross-sectional view of the illustrative gas valve of FIG. 2 in an off position.

FIG. 3 is a schematic cross-sectional view of the illustrative, but non-limiting gas valve 100 of FIG. 2 in a closed or off configuration. The illustrative gas valve 100 includes a valve body 102 that has a gas inlet 104, a gas outlet 106, and a conduit 110 connecting the gas inlet 104 and the gas outlet 106. In the illustrative embodiment shown, the conduit 110 includes a first flow chamber 112, a second flow chamber 114, and a third flow chamber 116. However, it is contemplated that the gas valve 100 may include fewer than or more than three flow chambers, as desired. The first flow chamber 112 may be in fluid communication with the gas inlet 104. The third flow chamber 116 may be in fluid communication with the gas outlet 106. The gas outlet 106 may be configured to connect to a gas burner of a water heater or other combustion appliance via a coupling (not explicitly shown). The gas valve 100 may further include a pilot burner outlet 108. In some embodiments, a pilot pressure regulator 118 may regulate the pressure at the pilot burner outlet 108. A main pressure regulator 120 may regulate the pressure at the main burner outlet 106.

To control the flow of gas through the flow chambers 112, 114, 116, the gas valve 100 may include a pilot gas valve, such as a manual pilot valve 122, a first valve 124, and a second valve 126. In this arrangement, the first valve 124 may also be referred to as the automatic pilot valve and the second valve 126 may also be referred to as the main valve. These valves may be used to control the flow of the gas to various components of the gas valve 100. In an illustrative embodiment, the manual pilot valve 122 might open and close to control gas flow from the first flow chamber 112 to an automatic pilot valve bypass 154. The automatic pilot valve bypass 154 might bypass the first valve 124 and connect the first flow chamber 112 to the second flow chamber 114 and, hence, to the pilot burner outlet 108. Flow through the automatic pilot valve bypass 154 can be limited by a pilot flow limiting orifice 156.

The first valve 124 can open and close to control gas flow from the first flow chamber 112 to the second flow chamber 114. The first valve 124 may include, for example, a diaphragm valve, although other types of valves can be used. In the case of a diaphragm valve as shown, the first valve 124 may include a first valve diaphragm 128 and a resilient spring 130. The resilient spring 130 biases the first valve 124 towards a first valve seat 132, causing the first valve 124 to be a normally closed valve.

The second valve 126 can open and close to control gas flow from the second chamber 114 to the third chamber 116. The second valve 126 may include, for example, a diaphragm valve, although other valve types may be used. In the case of a diaphragm valve as shown, the second valve 126 may include a second valve diaphragm 134 and a resilient spring 136. The resilient spring 136 may bias the second valve 126 towards a second valve seat 138 and cause the second valve 126 to be a normally closed valve.

The first valve 124 can open and close to control gas flow from the first flow chamber 112 to the second flow chamber 114. In some cases, the first valve 124 may be controlled by a first electronic valve actuator or millivolt (mV) operator 140. The first electronic valve actuator or servo valve 140 may control one or more pneumatic pressure paths that cause the first valve 124 to move away from the first valve seat 132 and to the open position. The underside of the first valve 124 may be in fluid communication with the gas inlet 104 through supply orifice 142. The pressure of the gas underneath the first valve 124 may help (e.g., in combination with resilient spring 130) maintain the first valve 124 sealed against the first valve seat 132 when the gas valve 100 is off and no gas flow is desired. As can be seen in FIG. 3, when no gas flow is desired, the gas is confined to the first flow chamber 112.

The first electronic valve actuator 140 can open and close to control gas flow from an electronic valve actuator supply 144 to the second flow chamber 114. By opening the first electronic valve actuator 140, gas can flow from the underside of the first valve diaphragm 128 towards the second flow chamber 114. This gas flow, in turn, can also act to release gas pressure from the underside of the first valve diaphragm 128. The supply orifice 142 can be sized to limit gas flow to and regulate re-pressurization of the underside of the diaphragm 128. As more gas fills the second flow chamber 114, the pressure above the diaphragm 128 (e.g., in the second flow chamber 114) overcomes the biasing force of the resilient spring 130 and the pressure under the diaphragm 128, and the first valve 124 opens.

The second valve 126 can open and close to control gas flow from the second flow chamber 114 to the third flow chamber 116, and thus to the gas burner (not explicitly shown). In some cases, the second valve 126 may be controlled by a second electronic valve actuator or millivolt (mV) operator 146. The electronic valve actuator or servo valve 146 may control one or more pneumatic pressure paths that cause the second valve 126 to move away from the second valve seat 138 and to the open position. The underside of the second valve 126 may be in fluid communication with the second flow chamber 114. The pressure of the gas underneath the second valve 126 may help (e.g., in combination with resilient spring 136) maintain the second valve 126 sealed against the second valve seat 138 when the gas valve 100 is off and no gas flow is desired. As can be seen in FIG. 3, when no gas flow is desired, the gas is confined to the first flow chamber 112. While not explicitly shown, in some cases gas may be confined to both the first flow chamber 112 and the second flow chamber 114 when no gas flow as desired.

The second electronic valve actuator 146 can open and close to control gas flow from an electronic valve actuator supply 148 to the third flow chamber 116. By opening the second electronic valve actuator 146, gas can flow from the underside of the second valve diaphragm 134 towards the third flow chamber 116. This gas flow, in turn, can also act to release gas pressure from the underside of the second valve diaphragm 134. The supply orifice 158 can be sized to limit gas flow to and regulate re-pressurization of the underside of the diaphragm 134. As more gas fills the third flow chamber 116, the pressure above the diaphragm 134 (e.g., in the third flow chamber 116) overcomes the biasing force of the resilient spring 136 and the pressure under the diaphragm 134, and the second valve 126 opens.

The electronic valve actuators 140, 146 may be electronically coupled to a controller and/or power source. In some cases, a thermopile that is exposed to the pilot and/or main burner flame may be used to supply energy to a controller and/or the electronic valve actuators 140, 146. Alternatively, or additionally, the power source may be an external power source such as, but not limited to line voltage or 24 Volt AC. When gas flow is desired (e.g., heat to the water heater of FIG. 1 is called for), a controller may actuate the first electronic valve actuator 140 to cause the first electronic valve actuator 140 to open. Once the first electronic valve actuator 140 is open, gas may begin to flow into the second flow chamber 114 through a now open channel 150. A restrictor may be provided in one or more channels to reduce the flow of gas in a particular flow direction. As the gas begins to flow into the second flow chamber 114, the pressure on top of the first valve 124 may become greater than the pressure underneath the first valve 124. Once the pressure on top of the first valve 124 increases above the combined force provided by the resilient spring 130 and the pressure underneath the first valve 124, the first valve 124 will move away from the first valve seat 132 under a pneumatic pressure, and allow for a flow of gas from the first flow chamber 112 to the second flow chamber 114.

It is contemplated that the second electronic valve actuator 146 may be actuated substantially simultaneously with or after the first electronic valve actuator 140. It is contemplated that the controller may actuate the second electronic valve actuator 146 to cause the second electronic valve actuator 146 to open. Once the second electronic valve actuator 146 is open, gas may begin to flow into the third flow chamber 116 through a now open channel 152. A restrictor may be provided in one or more channels to reduce the flow of gas in a particular flow direction. As the gas begins to flow into the third flow chamber to 116, the pressure on top of the second valve 126 may become greater than the pressure underneath the second valve 126. Once the pressure on top of the second valve 126 increases above the combined force provided by the resilient spring 136 and the pressure underneath the second valve 126, the second valve 126 will move away from the second valve seat 138 under a pneumatic pressure, and allow for a flow of gas from the second flow chamber 114 to the third flow chamber 116.

The gas valve assembly 100 of FIGS. 2 and 3 may include a first blocking valve 124 and a second blocking valve 126 to create a redundant gas valve. It is contemplated that other valve configurations including a single blocking valve may be used with only one valve actuator 140. Without limitation, some other valve configurations are described in commonly assigned U.S. patent application Ser. No. 15/717,908 filed on Sep. 27, 2017 and entitled "WATER HEATER GAS VALVE," the disclosure of which is hereby incorporated by reference.

In some cases, and as shown in FIG. 3, the first and second electronic valve actuators 140, 146 may be situated in the gas stream. As the quality of fuel gas decreases, gas supplies may include increasing concentrations of hydrogen sulfide. Some components within the electronic valve actuators 140, 146 may be highly susceptible to corrosion from hydrogen sulfide gas, which reacts with copper to form copper sulfide, especially in the presence of moisture. In such cases, it would be highly desirable to reduce the susceptibility of the electronic valve actuators 140, 146 to such corrosion. In some cases, the first and second electronic valve actuators 140, 146 may be moved to a location outside of or exterior to the valve body 102. In other words, the first and second electronic actuators 140, 146 may be removed from the gas flow path.

Figure 4:
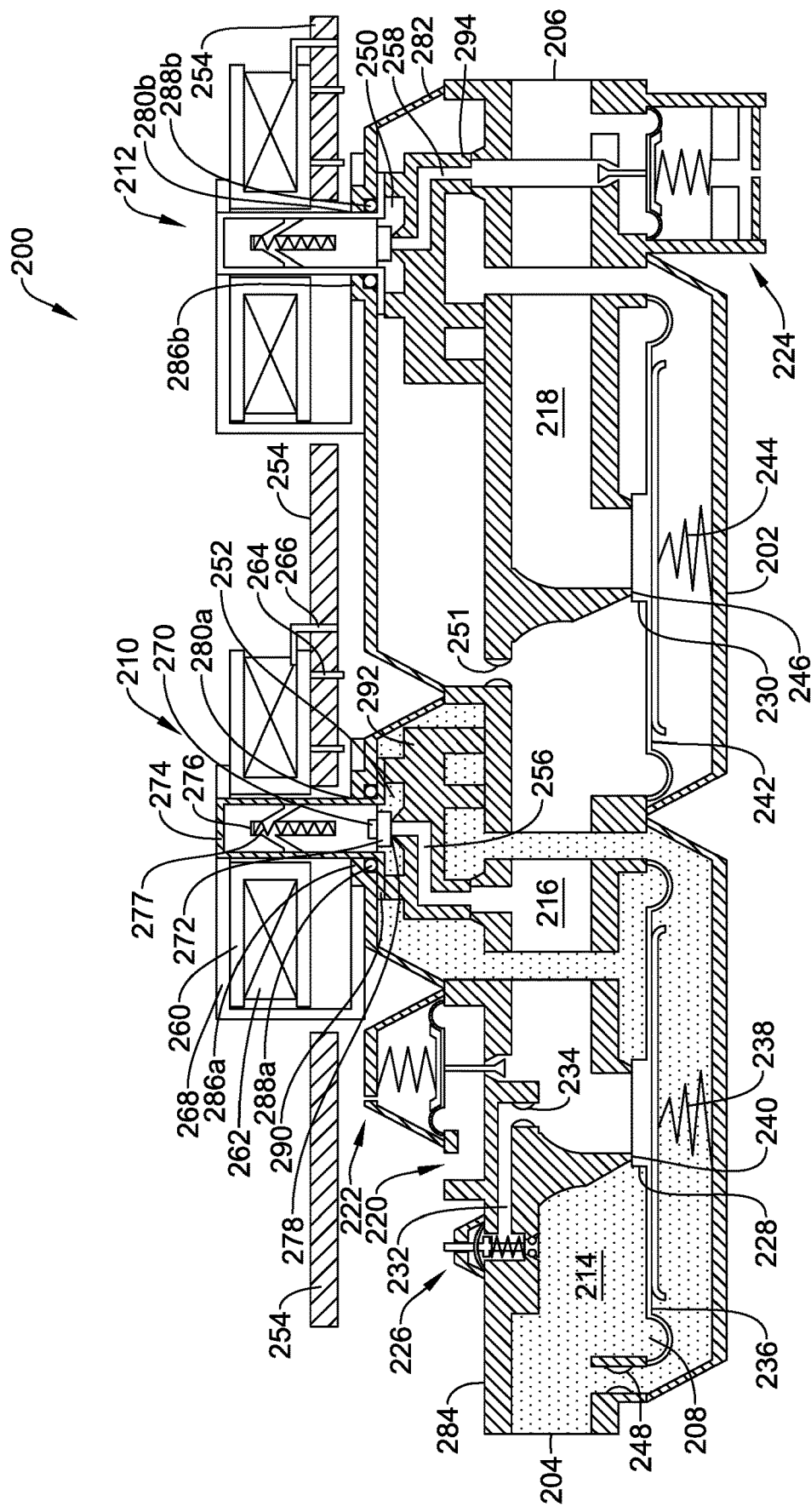
FIG. 4 is a schematic partial cross-sectional view of another illustrative gas valve in an off position.
Figure 5:
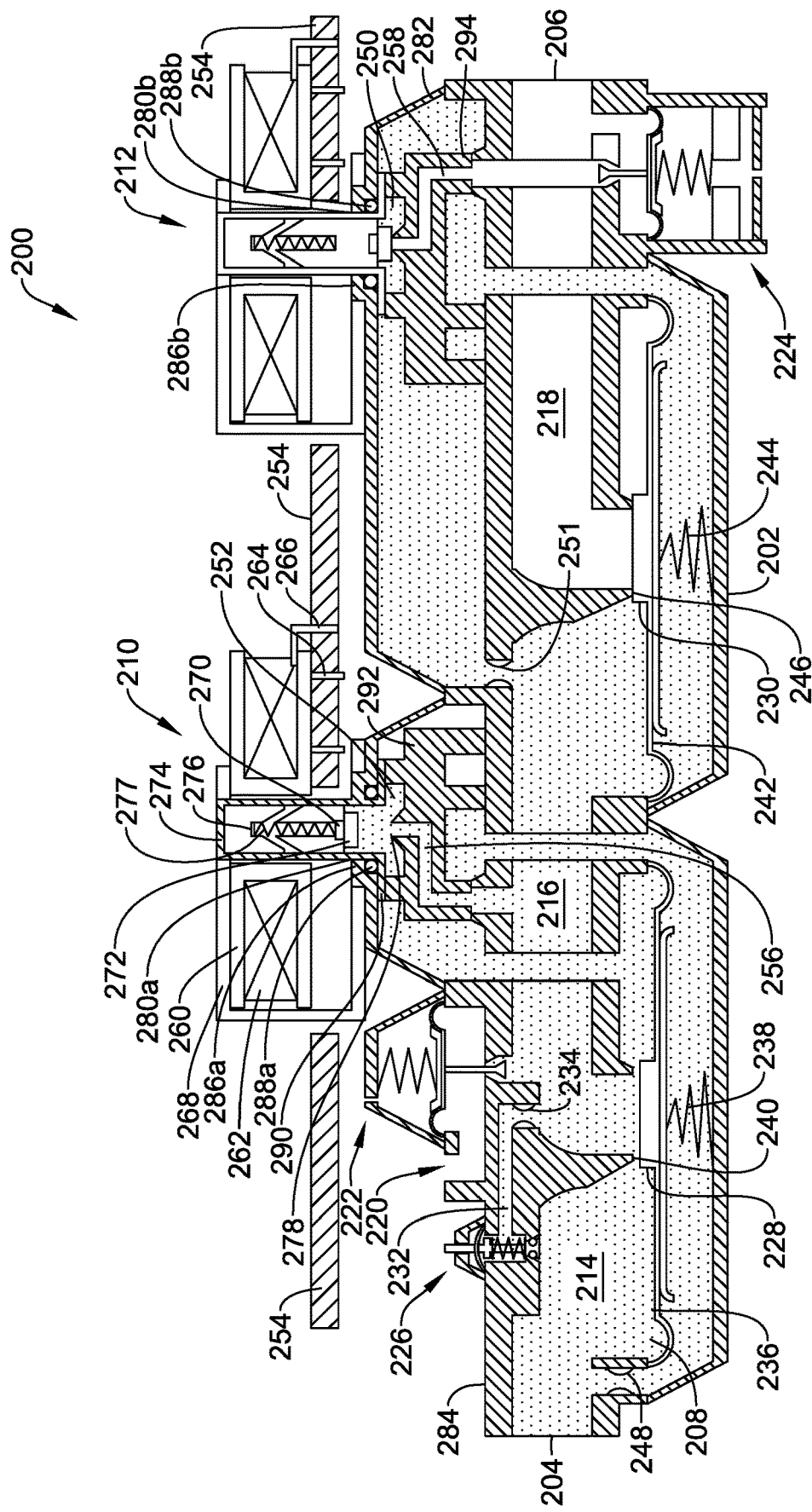
FIG. 5 is a schematic partial cross-sectional view of the illustrative gas valve of FIG. 4 with the first valve in the open position and the second valve in the closed position.

FIG. 4 is a schematic cross-sectional view of an illustrative, but non-limiting, gas valve 200 in a closed or off configuration with the electronic valve actuators 210, 212 at least partially fluidly isolated from the gas flow. FIG. 5 is a schematic cross-sectional view of the illustrative gas valve 200 with the first electronic valve actuator 210 in an open configuration. In addition to fluidly isolating a least a portion of the valve actuators 210, 212 from the gas flow to reduce or prevent corrosion of the various components thereof, it is contemplated that locating all or a substantial portion of the electronic valve actuators 210, 212 exterior to a valve body 202 may also increase flexibility in the design of the electronic valve actuators 210, 212 as there are fewer constraints on the design. In some cases, a lower cost magnetic material may be utilized.

The gas valve 200 may be similar in form and function to the gas valve 100 described above. The illustrative gas valve 200 includes a valve body 202 that has a gas inlet 204, a gas outlet 206, and a conduit 208 connecting the gas inlet 204 and the gas outlet 206. In the illustrative embodiment shown, the conduit 208 includes a first flow chamber 214, a second flow chamber 216, and a third flow chamber 218. However, it is contemplated that the gas valve 200 may include fewer than or more than three flow chambers, as desired. The first flow chamber 214 may be in fluid communication with the gas inlet 204. The third flow chamber 218 may be in fluid communication with the gas outlet 206. The gas outlet 206 may be configured to connect to a gas burner of a water heater or other combustion appliance via a coupling (not explicitly shown). The gas valve 200 may further include a pilot burner outlet 220. In some embodiments, a pilot pressure regulator 222 may regulate the pressure at the pilot burner outlet 220. A main pressure regulator 224 may regulate the pressure at the main burner outlet 206.

To control the flow of gas through the flow chambers 214, 216, 218, the gas valve 200 may include a pilot gas valve, such as a manual pilot valve 226, a first valve 228, and a second valve 230. In this arrangement, the first valve 228 may also be referred to as the automatic pilot valve and the second valve 230 may also be referred to as the main valve. These valves may be used to control the flow of the gas to various components of the gas valve 200. In an illustrative embodiment, the manual pilot valve 226 might open and close to control gas flow from the first flow chamber 214 to an automatic pilot valve bypass 232. The automatic pilot valve bypass 232 might bypass the first valve 228 and connect the first flow chamber 214 to the second flow chamber 216 and, hence, to the pilot burner outlet 220. Flow through the automatic pilot valve bypass 232 can be limited by a pilot flow limiting orifice 234.

The first valve 228 can open and close to control gas flow from the first flow chamber 214 to the second flow chamber 216. The first valve 228 may include, for example, a diaphragm valve, although other types of valves can be used. In the case of a diaphragm valve as shown, the first valve 228 may include a first valve diaphragm 236 and a resilient spring 238. The resilient spring 238 biases the first valve 228 towards a first valve seat 240, causing the first valve 228 to be a normally closed valve.

The second valve 230 can open and close to control gas flow from the second chamber 216 to the third chamber 218. The second valve 230 may include, for example, a diaphragm valve, although other valve types may be used. In the case of a diaphragm valve as shown, the second valve 230 may include a second valve diaphragm 242 and a resilient spring 244. The resilient spring 244 may bias the second valve 230 towards a second valve seat 246 and cause the second valve 230 to be a normally closed valve.

The first valve 228 can open and close to control gas flow from the first flow chamber 214 to the second flow chamber 216. In some cases, the first valve 228 may be controlled by a first electronic valve actuator or millivolt (mV) operator 210. The first electronic valve actuator or servo valve 210 may control one or more pneumatic pressure paths that cause the first valve 228 to move away from the first valve seat 240 and to the open position (see, for example, FIG. 5). The underside of the first valve 228 may be in fluid communication with the gas inlet 204 through supply orifice 248. The pressure of the gas underneath the first valve 228 may help (e.g., in combination with resilient spring 238) maintain the first valve 228 sealed against the first valve seat 240 when the gas valve 200 is off and no gas flow is desired. As can be seen in FIG. 4, when no gas flow is desired, the gas is confined to the first flow chamber 214.

The first electronic valve actuator 210 can open and close to control gas flow from an electronic valve actuator supply 252 to the second flow chamber 216. By opening the first electronic valve actuator 210, as shown in FIG. 5, gas can flow from the underside of the first valve diaphragm 236 towards the second flow chamber 216. This gas flow, in turn, can also act to release gas pressure from the underside of the first valve diaphragm 236. The supply orifice 248 can be sized to limit gas flow to and regulate re-pressurization of the underside of the diaphragm 236. As more gas fills the second flow chamber 216, the pressure above the diaphragm 236 (e.g., in the second flow chamber 216) overcomes the biasing force of the resilient spring 238 and the pressure under the diaphragm 236, and the first valve 228 opens.

The second valve 230 can open and close to control gas flow from the second flow chamber 216 to the third flow chamber 218, and thus to the gas burner (not explicitly shown). In some cases, the second valve 230 may be controlled by a second electronic valve actuator or millivolt (mV) operator 212. The electronic valve actuator or servo valve 212 may control one or more pneumatic pressure paths that cause the second valve 230 to move away from the second valve seat 246 and to the open position. The underside of the second valve 230 may be in fluid communication with the second flow chamber 216. The pressure of the gas underneath the second valve 230 may help (e.g., in combination with resilient spring 244) maintain the second valve 230 sealed against the second valve seat 246 when the gas valve 200 is off and no gas flow is desired. As can be seen in FIG. 4, when no gas flow is desired, the gas is confined to the first flow chamber 214. While not explicitly shown, in some cases gas may be confined to both the first flow chamber 214 and the second flow chamber 216 when no gas flow as desired.

The second electronic valve actuator 212 can open and close to control gas flow from an electronic valve actuator supply 250 to the third flow chamber 218. By opening the second electronic valve actuator 212, gas can flow from the underside of the second valve diaphragm 242 towards the third flow chamber 218. This gas flow, in turn, can also act to release gas pressure from the underside of the second valve diaphragm 242. The supply orifice 251 can be sized to limit gas flow to and regulate re-pressurization of the underside of the diaphragm 242. As more gas fills the third flow chamber 218, the pressure above the diaphragm 242

(e.g., in the third flow chamber 218) overcomes the biasing force of the resilient spring 244 and the pressure under the diaphragm 242, and the second valve 230 opens.

The electronic valve actuators 210, 212 may be electronically coupled to a controller and/or power source. In some cases, a conductive wire or coil (described in more detail below) of the electronic valve actuators 210, 212 may be coupled directly to a circuit board 254. Mounting the coils of the electronic valve actuators 210, 212 directly on the circuit board 254 may simplify the assembly and remove the coils from of the gas stream to protect them from corrosion. The coils may use a portion of the electronic valve actuators as mounting features for the circuit board 254. The circuit board 254 may be mounted to the valve body 202. This may allow for a more secure and potentially stronger mounting option compared to mounting the circuit board 254 inside of a control unit cover which is then mounted to a bracket assembly.

In some cases, a thermopile that is exposed to the pilot and/or main burner flame may be used to supply energy to a controller and/or the electronic valve actuators 210, 212. Alternatively, or additionally, the power source may be an external power source such as, but not limited to line voltage (e.g. 100 to 240 VAC, 50 to 60 Hz), or 24 Volts AC, or any other appropriate power source. When gas flow is desired (e.g., heat to the water heater of FIG. 1 is called for), a controller may actuate the first electronic valve actuator 210 to cause the first electronic valve actuator 210 to open. Once the first electronic valve actuator 210 is open, gas may begin to flow into the second flow chamber 216 through a now open channel 256. A restrictor may be provided in one or more channels to reduce the flow of gas in a particular flow direction. As the gas begins to flow into the second flow chamber 216, the pressure on top of the first valve 228 may become greater than the pressure underneath the first valve 228. Once the pressure on top of the first valve 228 increases above the combined force provided by the resilient spring 238 and the pressure underneath the first valve 228, the first valve 228 will move away from the first valve seat 240 under a pneumatic pressure, and allow for a flow of gas from the first flow chamber 214 to the second flow chamber 216.

It is contemplated that the second electronic valve actuator 212 may be actuated substantially simultaneously with or after the first electronic valve actuator 210. It is contemplated that the controller may actuate the second electronic valve actuator 212 to cause the second electronic valve actuator 212 to open. Once the second electronic valve actuator 212 is open, gas may begin to flow into the third flow chamber 218 through a now open channel 258. A restrictor may be provided in one or more channels to reduce the flow of gas in a particular flow direction. As the gas begins to flow into the third flow chamber to 218, the pressure on top of the second valve 230 may become greater than the pressure underneath the second valve 230. Once the pressure on top of the second valve 230 increases above the combined force provided by the resilient spring 244 and the pressure underneath the second valve 230, the second valve 230 will move away from the second valve seat 246 under a pneumatic pressure, and allow for a flow of gas from the second flow chamber 216 to the third flow chamber 218.

The gas valve assembly 200 of FIG. 4 may include a first blocking valve 228 and a second blocking valve 230 to create a redundant gas valve. It is contemplated that other valve configurations including a single blocking valve may be used with only one valve actuator 210. Without limitation, some other valve configurations are described in commonly assigned U.S. patent application Ser. No. 15/717,908 filed on Sep. 27, 2017 and entitled "WATER HEATER GAS VALVE," the disclosure of which is hereby incorporated by reference.

In some cases, and as shown in FIG. 4, the first and second electronic valve actuators 210, 212 may be situated such that they are substantially fluidly isolated from the gas stream. It is contemplated that the valve seat of the first and second electronic valve actuators 210, 212 may come into contact with the gas stream, as will be described in more detail herein. As the quality of fuel gas decreases, gas supplies may include increasing concentrations of hydrogen sulfide. Some components within the electronic valve actuators 210, 212 may be highly susceptible to corrosion from hydrogen sulfide gas, which reacts with copper to form copper sulfide, especially in the presence of moisture. Fluidly isolating these components from the gas stream may reduce the susceptibility of the electronic valve actuators 210, 212 to such corrosion.

The first and second electronic valve actuators 210, 212 may be similar in form and function. The structure of the first and second electronic valve actuators 210, 212 are further described using the first electronic valve actuator 210 as a generic valve actuator. It should be understood that the second electronic valve actuator 212 includes similar structure and functions in a similar manner to the first electronic valve actuator 210.

The illustrative electronic valve actuator 210 includes a non-conductive support member or bobbin 260. The support bobbin 260 may be mechanically coupled to the circuit board via one or more connection posts 264. A conductive wire 262 may be wound around at least a portion of the support bobbin 260 to form a magnetic coil. A first end portion (not explicitly shown) of the conductive wire 262 may be electrically coupled to an interconnect pin 266, and a second end portion (not explicitly shown) of the conductive wire 262 may be electrically coupled with a ground terminal (not explicitly shown). In some instances, the conductive wire 262 may be an insulated copper wire. However, other conductive materials, such as, but not limited to, nickel or aluminum, may be used to form the conductive wire 262, as desired. The conductive wire 262 may have a length wound about the support bobbin 260. The length may be selected to generate a predetermined magnetic field when current flows through the conductive wire 262. The interconnect terminal 266 may be electrically coupled to the circuit board 254, sometimes using a non-copper wire (such as, but not limited to, a nickel wire). In some cases, the interconnect terminal 266 and/or the ground terminal may be formed of brass with a nickel flash layer followed by a tin plating layer, although this is not required. Additionally, or alternatively, the interconnect pin 266 may be configured to be electrically connected to a power source, controller, or other mechanism in place of or in addition to the circuit board 254 for selectively supplying current to the conductive wire to control the open/close position of the valve actuator 210.

The illustrative electronic valve actuator 210 may further include a magnetic flux concentration member 268. The magnetic flux concentration member 268 may be, for example, a soft ferromagnetic material, such as iron. In some cases, an armature or plunger 270 and a plunger stop 276 may be positioned within a non-magnetic solenoid sleeve 274. The plunger 270 may be movable between a first position and a second position to maintain a valve seal 272 in a closed configuration or an open configuration, as desired. A spring, or other biasing mechanism 277 may extend between the plunger 270 and the plunger stop 276 and/or a portion of the non-magnetic solenoid sleeve 274. In the example shown, the spring 277 may exert a bias force on the plunger 270 to bias the valve seal 272 into a normally closed configuration. When the plunger 270 is in the closed configuration, the valve seal 272 may contact a valve seat 278 of the valve body 202 and prevent a flow of gas therethrough.

As an electrical current is passed through the conductive wire 262 (provided via the interconnect pin 266), a magnetic field is generated and collected by the magnetic flux concentration member 268. The magnetic flux path of a solenoid may go through the center of the bobbin 260 (e.g., the center of the coil 262), around the outside of the bobbin 260 in all directions, and back to the center. The magnetic flux concentration member 268 may bias the magnetic flux towards the magnetic flux concentration member 268 such that most of the flux will go the through the magnetic flux concentration member 268 surrounding the outside of the conductive coil 262. It is contemplated that the magnetic flux concentration member 268 may completely surround the coil 262 (e.g., 360 degrees) or the magnetic flux concentration member 268 might only go around one side, as shown. The magnetic flux completely surrounds the conductive coil 262 in either configuration. However, if the magnetic flux concentration member 268 only goes around one side of the conductive coil, then the vast majority of the magnetic flux will be conducted through one side.

A magnetic attraction between the plunger 270 and the plunger stop 276 may be used to move the plunger 270 from the normally closed configuration is illustrated in FIG. 4 to an open configuration (not explicitly shown). In the example shown, a first end of plunger 270 may be attracted to and come into contact with the plunger stop 276. This magnetic attraction may cause the plunger 270 to overcome the biasing force of the spring and move such that the valve seal 272 is lifted upward and away from a valve seat 278, allowing a flow of gas to pass by the valve seat of the valve body 202. While the electronic valve actuator 210 is described as lifting or raising the valve seal 272, it is contemplated that the electronic valve actuator 210 may be structured to push a shaft-mounted servo-valve in a manner similar to the manual pilot assembly 226. For example, electronic valve actuators 210, 212 may include a spring loaded seal and shaft that extends through the top of the cover 282 and is sealed by the diaphragm similar to the manual pilot shaft assembly 226. An external force may be used to actuate valve actuators 210, 212. The external force may be produced by an actuator, such as a solenoid, mounted external to the valve body 202.

The valve body 202 may include a removable cover 282. The removable cover 282 may be releaseably secured to a top portion 284 of the valve body 202 by one or more fastening mechanisms, such as, but not limited to, screws, bolts, etc. The cover 282 may include one or more openings 280a, 280b (collectively, 280) sized and shaped to allow the solenoid sleeve 274 of the electronic valve actuators 210, 212 to pass through the cover 282. The solenoid sleeve 274 further includes a flanged end region 290 to create a mechanical interlock or mechanical stop between the solenoid sleeve 274 and the cover 282. In some cases, the cover 282 may include one or more raised regions 286a, 286b (collectively, 286) adjacent to the openings 280. The raised regions 286 may be sized as shaped such that an o-ring 288a, 288b (collectively, 288), or other sealing member, may be positioned between an inner surface of the cover 282 and the flanged end region 290 of the solenoid sleeve 274. In some instances, the raised region(s) 286 may also form a portion of the magnetic flux path of the magnetic flux concentration member 268.

In some embodiments, the electronic valve actuator supply 252 and the gas flow channel 256 may be formed by an adaptor 292 inserted into a cavity of a valve body that previously held an electronic valve actuator (for example, within the electronic valve actuator supply 144 illustrated in FIG. 3). Similarly, the electronic valve actuator supply 250 and the gas flow channel 258 adjacent to the second electronic valve actuator 212 may be formed by an adaptor 294 inserted into a cavity of a valve body that previously held an electronic valve actuator (for example, within the electronic valve actuator supply 148 illustrated in FIG. 3). This may allow a valve (e.g., valve 100) that has previously held one or more internal electronic valve actuators (e.g., valve actuators 140, 146 as shown in FIG. 3) to be retrofitted with one or more electronic valve actuators 210, 212 that fluidly isolate at least the conductive coil 262 from the gas flow. For example, it is contemplated that the adaptors 292, 294 may provide a gas path and appropriate seals from the valve seat location of the valve 100 (see, for example, FIG. 3) to the axis of the plunger stop 276 (and/or plunger 270) as well as providing features to hold the solenoid sleeve 274 in its proper location tight against the underside of the cover 282. It is further contemplated that in a retrofit application, the adaptors 292, 294 may also use existing electronic valve actuator mounting features and location features for correct positioning thereof. The adaptors 292, 294 may be separately formed components (e.g., separate from the cover 282 and/or the top portion 284) that are mounted next to or coupled to the top portion 284 of the valve body 202 to route the flow of gas through the electronic valve actuators 210, 212. In other embodiments, the adaptors 292, 294 may be formed as a unitary structure with the top portion 284 of the valve body 202.

While not explicitly shown, a control knob, which may be used to turn a potentiometer and/or to press a manual pilot shaft, may be partially located within the cover 282. A shaft of the control know may extend through cover 282 and into a potentiometer mounted on the circuit board 254. Alternatively, in intermittent pilot applications or applications with energy storage, the control knob and a small circuit board containing the potentiometer and a connector may be mounted to the control cover to allow flexibility in the control knob location and design. Alternatively, or additionally, to the potentiometer, other devices that could sense the rotation or other movement of the control knob may also be used, including, but not limited to, an encoder. For applications with energy storage and either manual or electronic pilot ignition, the knob may activate a momentary switch when pressed which would energize the pilot-side solenoid for the purpose of lighting the pilot.

Figure 6A:
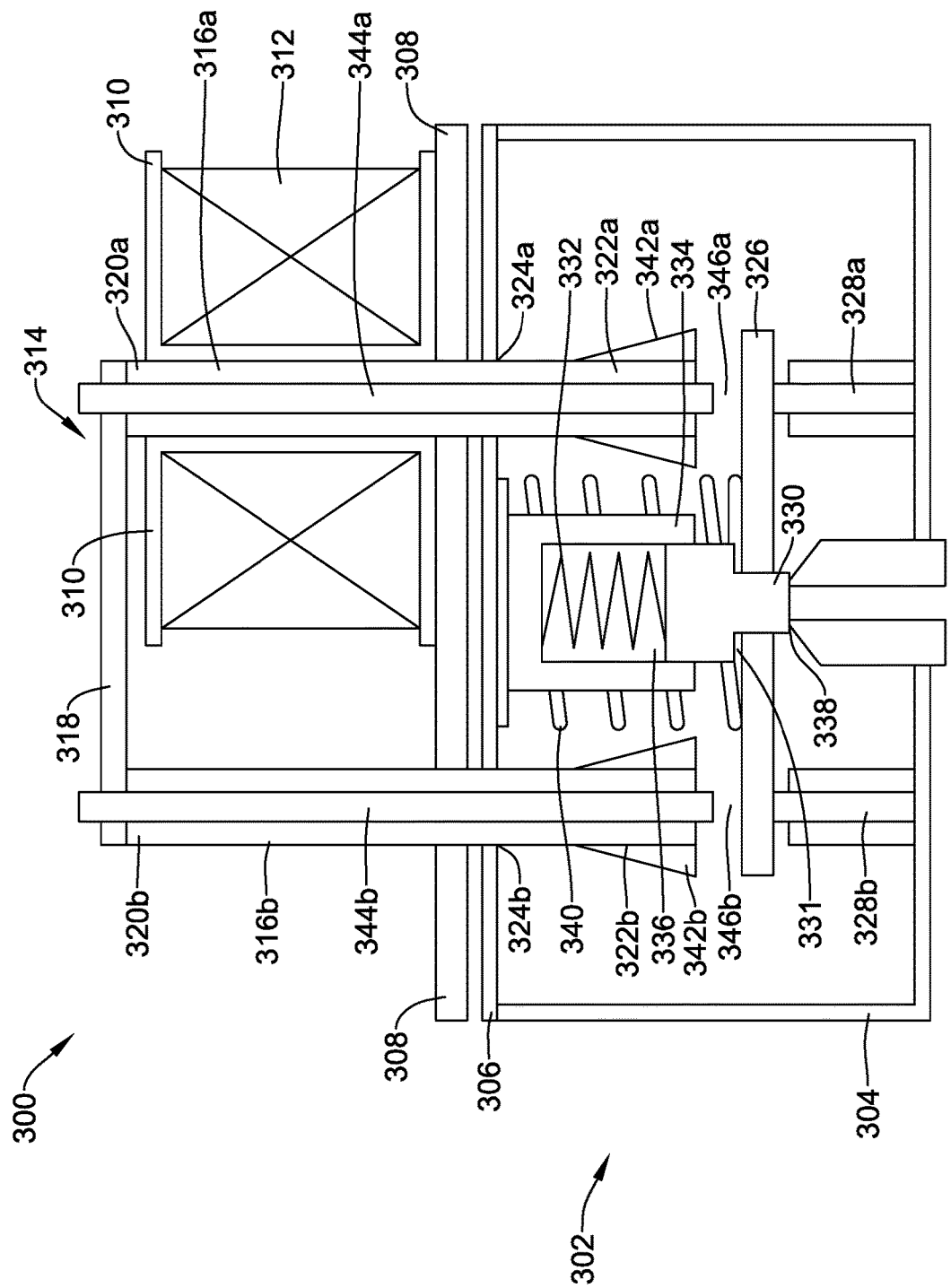
FIG. 6A is a schematic partial cross-sectional view of another illustrative servo valve in an off position.
Figure 6B:
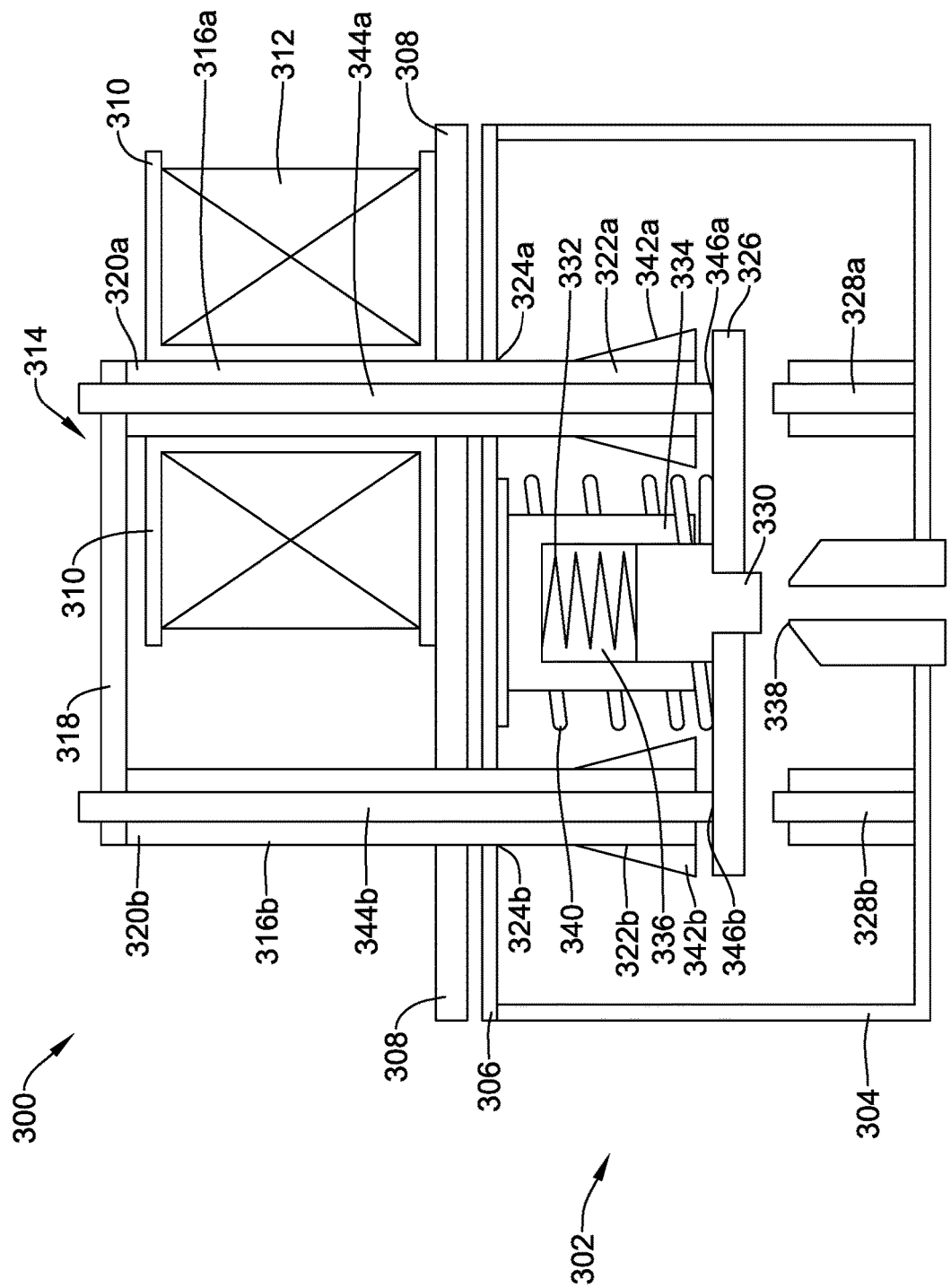
FIG. 6B is a schematic partial cross-sectional view of the illustrative servo valve of FIG. 6A in an on position.

FIG. 6A is a schematic partial cross-sectional view of another illustrative electronic valve actuator or servo valve 300 in a closed configuration and configured to be mounted to a gas valve 302 such that electronic valve actuator 300 is at least partially fluidly isolated from the gas flow. FIG. 6B is a schematic partial cross-section view of the illustrative electronic valve actuator 300 in an open configuration. The gas valve 302 may include a gas valve body 304 and a cover 306, as will be described in more detail herein. For brevity FIG. 6A and FIG. 6B illustrate only a portion of the gas valve 302 where the electronic valve actuator 300 engages a valve seat. It should be understood that the gas valve 302 may include similar features to the gas valve 200 described above. For example, the electronic valve actuator 300 described herein may be used in place of either of the electronic valve actuators 210, 212 described above.

In addition to fluidly isolating a least a portion of the electronic valve actuator 300 from the gas flow to reduce or prevent corrosion of the various components thereof, it is contemplated that locating all or a substantial portion of the electronic valve actuator 300 exterior to a valve body 304 may also increase flexibility in the design of the electronic valve actuator 300 as there are fewer constraints on the design, and may help to provide easier access to the electronic valve actuators 300 during service calls. In some cases, a lower cost magnetic material may be utilized.

The electronic valve actuator 300 may be electronically coupled to a controller and/or power source. In some cases, the electronic valve actuator 300 may be coupled directly to a circuit board 308. In some embodiments, the circuit board 308 may be mounted to portions of the electronic valve actuator 300, such as, but not limited to the pole pieces 316a, 316b (described in more detail herein). This may allow for a more secure and potentially stronger mounting option compared to mounting the circuit board 308 inside of a control unit cover which is then mounted to a bracket assembly. In other embodiments, the circuit board 308 may be mounted to the valve body 304 and/or the removable cover 306.

In some cases, and as shown in FIGS. 6A and 6B, the electronic valve actuator or servo valve 300 may be situated such that at least the coil assembly 310, 312 (described in more detail herein) is substantially fluidly isolated from the gas flow stream. As the quality of fuel gas decreases, gas supplies may include increasing concentrations of hydrogen sulfide. Some components within the electronic valve actuator 300 (such as, but not limited to copper components) may be highly susceptible to corrosion from hydrogen sulfide gas, which reacts with copper to form copper sulfide, especially in the presence of moisture. Fluidly isolating these components from the gas stream may reduce the susceptibility of the electronic valve actuator 300 to such corrosion.

The illustrative electronic valve actuator 300 includes a non-conductive support member or bobbin 310. The support bobbin 310 may be mechanically coupled to the circuit board 308 via one or more connection posts (not explicitly show). A conductive wire 312 may be wound around at least a portion of the support bobbin 310 to form a magnetic coil. A first end portion (not explicitly shown) of the conductive wire 312 may be electrically coupled to an interconnect pin (not explicitly shown), and a second end portion (not explicitly shown) of the conductive wire 312 may be electrically coupled with a ground terminal (not explicitly shown). In some instances, the conductive wire 312 may be an insulated copper wire. However, other conductive materials, such as, but not limited to, nickel or aluminum, may be used to form the conductive wire 312, as desired. The conductive wire 312 may have a length which is wound about the support bobbin 310. The length may be selected to generate a predetermined magnetic field when current flows through the conductive wire 312. The interconnect terminal may be electrically coupled to the circuit board 308, sometimes using a non-copper wire (such as, but not limited to, a nickel wire). Additionally, or alternatively, the interconnect pin may be configured to be electrically connected to a power source, controller, or other mechanism in place of or in addition to the circuit board 308 for selectively supplying current to the conductive wire to control the open/close position of the valve actuator 300.

The illustrative electronic valve actuator 300 may further include a magnetic flux concentration member 314. The magnetic flux concentration member 314 may be, for example, a soft ferromagnetic material, such as iron. The magnetic flux concentration member may have a generally "U" shaped configuration including a pair of laterally spaced parallel legs or pole pieces 316a, 316b (collectively, 316) and an interconnecting frame 318 (e.g., a third leg) extending between a first end region 320a, 320b (collectively, 320) of each pole piece 316. The pole pieces 316 may extend from the first end region 320 to a second end region 322a, 322b (collectively, 322). The first end region 320 may be positioned exterior to the valve body 304 and the cover 306, while the second end region 322 may be positioned within and enclosed by the valve body 304 and cover 306.

As described above, the valve body 304 may include a removable cover 306. The removable cover 306 may be releaseably secured to the valve body 304 by one or more fastening mechanisms, such as, but not limited to, screws, bolts, etc. The cover 306 may include one or more openings 324a, 324b (collectively, 324) sized and shaped to allow the pole pieces 316 of the magnetic flux concentration member to pass through the cover 306. The openings 324 may include sealing features configured to provide a fluid tight seal around the outer surface of the legs 316. In some embodiments, the sealing feature may include a deformable o-ring (not explicitly shown) configured to conform to an outer surface of the legs. This is just an example. Other suitable sealing mechanisms may be used as desired.

The removable cover 306 may be formed such that the removable cover 306 does not form part of the magnetic flux concentration member 314 during operation. For example, the removable cover 306 may be formed from a non-magnetic material. Alternatively, the removable cover 306 may be formed from a magnetic material with a non-magnetic material region surrounding the openings 324. In such an instances, the non-magnetic material region may have a diameter selected to prevent magnetic "shorting" of the magnetic flux path.

In some cases, an armature 326 may be positioned between the second end regions 322 of the pole pieces 316 and one or more armature stops 328a, 328b (collectively, 328). The armature 326 may be fully enclosed within the valve 302 (e.g., within an interior defined by the valve body 304 and cover 306). In some cases, a height of the armature stops 328 may be adjustable to manipulate the pick current (i.e. current required to "pick", or open, the valve). The armature 326 may be magnetically movable between a first position and a second position to maintain a valve seal 330 in a closed configuration (see, for example, FIG. 6A) or an open configuration (see, for example, FIG. 6B) relative to a valve seat 338, as desired. In some cases, the valve seal 330 may be coupled to or extend through an opening in the armature 326.

In some cases, a valve spring 332, or other biasing mechanism, may extend between the valve seal 330 and a valve housing 334. The valve housing 334 may be positioned within the valve 302 and may be situated between the cover 306 and the armature 326. The valve housing 334 may include a recess or cavity 336 configured to receive the valve spring 332 and, optionally, a portion of the valve seal 330. The valve spring 332 may bias the valve seal 330 towards the closed configuration. An armature spring 340 may be positioned between the cover 306 and the armature 326. The armature spring 340 may be configured to bias the armature 326 towards the armature stops 328 such that the valve seal 330 is biased towards the closed configuration. The valve spring 332, armature spring 340, and/or main valve springs (see, for example, FIG. 5) may have a height and force which may be adjustable thus allowing the pick current to be adjustable. It is further contemplated that adjusting or changing the height and force of the valve spring 332 may change the maximum gas flow rate. When the armature 326 is in the closed configuration, the valve seal 330 may contact a valve seat 338 of the valve body 304 and prevent a flow of gas therethrough. It is contemplated that when the valve seal 330 is in the closed configuration (FIG. 6A), there may be a gap 331 between a top surface of the armature 326 and a bottom surface of a portion of the valve seal 330. The valve spring 332 may bias the valve seal 330 toward the closed position. When so provided, the valve seal 330 moves with the armature 326 until the valve seal 330 engages the valve seat 338, at which time the armature 336 may continue to move by an over-travel amount. In FIG. 6A, the over-travel amount may be represented by the gap 331.

In some embodiments, the valve seat 338 may be adjustable. For example, the position of the valve seat 338 may be adjusted up or down to change how far the valve 330 opens. This would change the gas flow. This may allow the valve opening to be adjusted independently of the armature travel to adjust a gas flow rate. Alternately, the cavity 336 of the valve housing 334 could be adjustable and the valve seat 338 fixed. However, this may require the height of the pole pieces 316 to be adjustable as well.

The pole pieces 316 may be made or fitted with a flared base 342a, 342b (collectively, 342) with flat, angled, or proportional air gap geometry. In some cases, the pole pieces 316 may include an adjustable component 344a, 344b (collectively, 344) configured to slide/move to adjust the minimum air gap 346a, 346b (collectively, 346). It is contemplated that adjusting the air gap 346 may allow the pick and drop current to be adjusted. The portion of the armature 326 that mates with the pole pieces 316 may be constructed with a corresponding type of geometry such that the air gap 346a, 346b cross section to be sized and shaped independent of the pole piece 316 cross section which allows the magnetic force magnitude and profile to be tailored for a given coil current and air gap.

As an electrical current is passed through the conductive wire 312 (provided via the interconnect pin), a magnetic field is generated and collected by the magnetic flux concentration member 314. A magnetic attraction between the armature 326 and the magnetic flux concentration member 314 may be used to move the armature 326 from the normally closed configuration illustrated in FIG. 6A to an open configuration illustrated in FIG. 6B. In the example shown, a top side of the armature 326 may be attracted to and come into contact with the magnetic flux concentration member 314. This magnetic attraction may cause the armature 326 to overcome the biasing force of the valve spring 332 and/or the armature spring 340 and move such that the valve seal 330 is lifted upward and away from a valve seat 338, allowing a flow of gas to pass by the valve seat 338 of the valve body 304. While the electronic valve actuator 300 is described as lifting or raising the valve seal 330, it is contemplated that the electronic valve actuator 300 may be structured to push a shaft-mounted servo-valve in a manner similar to a manual pilot assembly. For example, electronic valve actuator 300 may include a spring loaded seal and shaft that extends through the top of the cover 306 and is sealed by the diaphragm similar to a manual pilot assembly. An external force may be used to actuate the valve actuator 300. The external force may be produced by an actuator, such as a solenoid, mounted external to the valve body 304.

The valve seal 330 and/or valve seat 338 do not necessarily need to be in the center of the armature 326, as shown. The valve seal 330 and/or valve seat 338 could be located off-center relative to the armature 326. In other embodiments, the armature 326 may extend past the pole pieces 316 and the valve seal 330 may be located in that extension. Although not explicitly shown, rather than having the armature 326 lift at both ends evenly across the two air gaps 346, the armature 326 could be hinged at or near one pole piece 316a, 316b and pivot to close the air gap 346a, 346b at the other. In yet another embodiment, the pole pieces 316 and the armature 326 could be designed so that the air gaps 346 are uneven causing one air gap 346a, 346b to close before the other in a staged manner. This may cause the valve seal 330 to tilt to open as it comes off the seat 338, which may result in a slower rise rate of the gas flow as the valve 330 opens which may be advantageous for some burner lighting situations. It is further contemplated that the pole pieces 316 may be used as mounting and locating features for a cover (not explicitly shown) that may be installed over the assembly 300. For example, the pole pieces 316 may extend above the frame top 318 and mate with features in the cover.

Although FIGS. 6A and 6B illustrate the conductive wire 312 as wound such that the axis oriented vertically, the coil axis could also be oriented horizontally and positioned around the frame top 318. It is further contemplated that the electronic valve actuator 300 may use two coils with one around each pole piece 316a, 316b. This may reduce the amount of conductive wire 312 needed to achieve the same magnetic force, reduce the height of the coils 312 and pole pieces 316 above the circuit board 308, as well as increase the overall magnetic efficiency. Similarly, if space allowed, a third coil could be added to the frame top 318 further increasing the magnetic efficiency. In the example of two coils mounted on the pole pieces 316, the coils may have two separate bobbins 310 or could be wound on one bobbin as a coil module. The use of one bobbin may allow for the use of one continuous piece of conductive wire 312 and avoid having additional connectors for each coil.

If the geometry of the valve 302 permitted, three or more pole pieces 316 may be used. For example, the pole pieces 316 may be arranged in a non-linear and symmetric pattern such as an equilateral triangle, square, etc. This would enable the use of two or more coils, one per pole piece, resulting in higher magnetic efficiency as the number of pole pieces is increased. These coils could be located on one or multiple bobbins. Further, the total cross sectional area of the pole pieces may remain the same as a design with the same magnetic force and fewer pole pieces. This would provide an even further increase in magnetic efficiency. It is contemplated that the electronic valve actuator may have six or more pole pieces 316. In an embodiment with six or more pole pieces, every other pole piece could be a different air gap from its adjacent pole piece for the purpose of controlling the drop out current.

While not explicitly shown, a control knob, which may be used to turn a potentiometer and/or to press a manual pilot shaft, may be partially located within the cover 306. Alternatively, or additionally, to the potentiometer, other devices that could sense the rotation or other movement of the control knob may also be used, including, but not limited to, an encoder. A shaft of the control know may extend through cover 306 and into a potentiometer mounted on the circuit board 308. Alternatively, in intermittent pilot applications or applications with energy storage, the control knob and a small circuit board containing the potentiometer and a connector could be mounted to the control cover to allow flexibility in the control knob location and design. For applications with energy storage and either manual or electronic pilot ignition, the knob may activate a momentary switch when pressed which would energize the pilot-side solenoid for the purpose of lighting the pilot.

It is contemplated that the various adjustment features described with respect to the electronic valve actuator 300 may be selected or deselected, as desired. For example, the valve 330 over-travel, valve housing 334, and/or valve spring 332 may be removed. In such an embodiment, the valve seal 330 may be located in the armature 326 resulting in a maximum flow that could not be adjusted independent of the pick current. Alternatively, or additionally, the minimum air gap adjustment components 344 may be removed. The minimum air gap may be set with a spacer or features on the pole pieces 316 and/or on the armature 326. This may result in a fixed minimum air gap and a non-adjustable drop current. Alternatively or additionally, the valve seat 338 adjustment may be removed resulting in a fixed opening distance and non-adjustable gas flow. In yet another example, the armature stop 328 adjustability may be removed resulting in a fixed max air gap and non-adjustable pick current.

Figure 7:
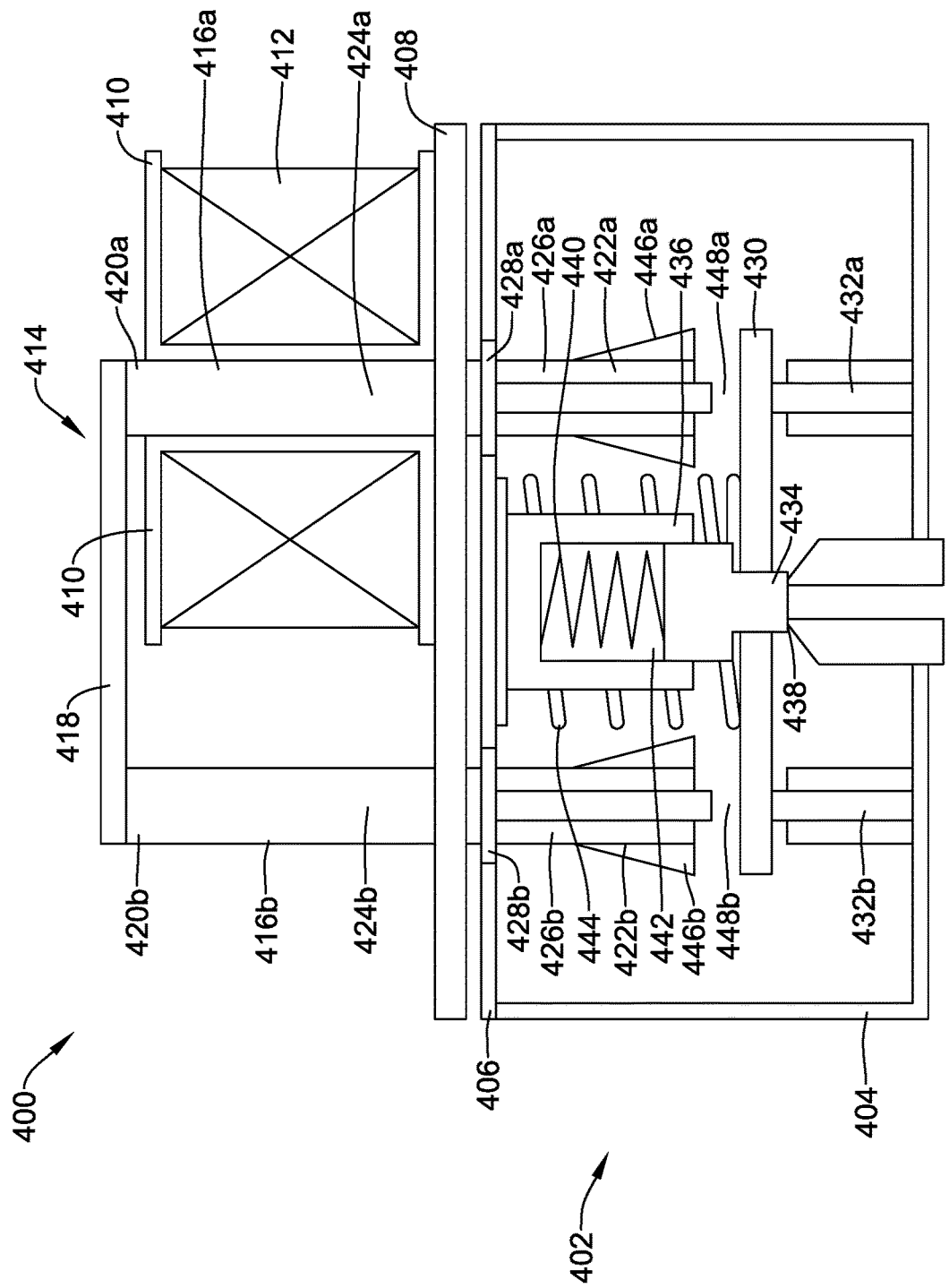
FIG. 7 is a schematic partial cross-sectional view of another illustrative servo valve in an off position.

FIG. 7 is a schematic partial cross-sectional view of another illustrative electronic valve actuator or servo valve 400 in a closed configuration and configured to be mounted to a gas valve 402 such that electronic valve actuator 400 is at least partially fluidly isolated from the gas flow. The gas valve 402 may include a gas valve body 404 and a cover 406, as will be described in more detail herein. For brevity FIG. 7 illustrates only a portion of the gas valve 402 where the electronic valve actuator 400 engages a valve seat. It should be understood that the gas valve 402 may include similar features to the gas valve 200 described above. For example, the electronic valve actuator 400 described herein may be used in place of either or both of the electronic valve actuators 210, 212 described above.

In addition to fluidly isolating a least a portion of the electronic valve actuator 400 from the gas flow to reduce or prevent corrosion of the various components thereof, it is contemplated that locating all or a substantial portion of the electronic valve actuator 400 exterior to a valve body 404 may also increase flexibility in the design of the electronic valve actuator 400 as there are fewer constraints on the design. In some cases, a lower cost magnetic material may be utilized.

The electronic valve actuator 400 may be electronically coupled to a controller and/or power source. In some cases, the electronic valve actuator 400 may be coupled directly to a circuit board 408. The circuit board 408 may be mounted to the valve body 404 and/or the removable cover 402. This may allow for a more secure and potentially stronger mounting option compared to mounting the circuit board 408 inside of a control unit cover which is then mounted to a bracket assembly.

In some cases, and as shown in FIG. 7, the electronic valve actuator 400 may be situated such that at least the coil assembly 410, 412 (described in more detail herein) is substantially fluidly isolated from the gas flow stream. As the quality of fuel gas decreases, gas supplies may include increasing concentrations of hydrogen sulfide. Some components within the electronic valve actuator 400 (such as, but not limited to copper components) may be highly susceptible to corrosion from hydrogen sulfide gas, which reacts with copper to form copper sulfide, especially in the presence of moisture. Fluidly isolating these components from the gas stream may reduce the susceptibility of the electronic valve actuator 400 to such corrosion.

The illustrative electronic valve actuator 400 includes a non-conductive support member or bobbin 410. The support bobbin 410 may be mechanically coupled to the circuit board 408 via one or more connection posts (not explicitly show). A conductive wire 412 may be wound around at least a portion of the support bobbin 410 to form a magnetic coil. A first end portion (not explicitly shown) of the conductive wire 412 may be electrically coupled to an interconnect pin (not explicitly shown), and a second end portion (not explicitly shown) of the conductive wire 412 may be electrically coupled with a ground terminal (not explicitly shown). In some instances, the conductive wire 412 may be an insulated copper wire. However, other conductive materials, such as, but not limited to, nickel or aluminum, may be used to form the conductive wire 412, as desired. The conductive wire 412 may have a length which is wound about the support bobbin 410. The length may be selected to generate a predetermined magnetic field when current flows through the conductive wire 412. The interconnect terminal may be electrically coupled to the circuit board 408, sometimes using a non-copper wire (such as, but not limited to, a nickel wire). Additionally, or alternatively, the interconnect pin may be configured to be electrically connected to a power source, controller, or other mechanism in place of or in addition to the circuit board 408 for selectively supplying current to the conductive wire to control the open/close position of the valve actuator 400.

The illustrative electronic valve actuator 400 may further include a magnetic flux concentration member 414. The magnetic flux concentration member 414 may be, for example, a soft ferromagnetic (or ferrimagnetic) material, such as iron. The magnetic flux concentration member may have a generally "U" shaped configuration including a pair of laterally spaced parallel legs or pole pieces 416a, 416b (collectively, 416) and an interconnecting frame 418 extending between a first end region 420a, 420b (collectively, 420) of each pole piece 416. The pole pieces 416 may extend from the first end region 420 to a second end region 422a, 422b (collectively, 422). The first end region 420 may be positioned exterior to the valve body 404 and the cover 406 while the second end region 422 may be positioned within and enclosed by the valve body 404 and cover 406. In some embodiments, the pole pieces 416 may be formed as two separate components: an external component 424a, 424b (collectively, 424) and an internal component 426a, 426b (collectively, 426). Forming the pole pieces 416 as separate external components 424 and internal components 426 eliminate the need to have seals surrounding the pole pieces 416 where the pass through the cover 406 and eliminate a minimum air gap adjustment component.

As described above, the valve body 404 may include a removable cover 406. The removable cover 406 may be releaseably secured to the valve body 404 by one or more fastening mechanisms, such as, but not limited to, screws, bolts, etc. The removable cover 406 may be formed such that the magnetic flux path of the magnetic flux concentration member is not shorted during operation. For example, the removable cover 406 may be formed from a non-magnetic material. In some embodiments, the removable cover 406 may be include a magnetically conductive disc 428a, 428b (collectively, 428) between the external components 424 and internal components 426 of the pole pieces 416, although this is not required. It is contemplated that magnetically conductive discs 428 may increase the magnetic force relative to the use of a non-magnetically conductive portion between the external components 424 and internal components 426 of the pole pieces 416. In some embodiments, the magnetically conductive discs 428 may include features (e.g., apertures configured to receive a mating protrusion, etc.) for locating the external components 424 and internal components 426 of the pole pieces 416. Alternatively, or additionally, the removable cover 406 may include features for locating the external components 424 and internal components 426 of the pole pieces 416.

In some cases, an armature 430 may be positioned between the second end regions 422 of the pole pieces 416 and one or more armature stops 432a, 432b (collectively, 432). The armature 430 may be fully enclosed within the valve 402 (e.g., within an interior defined by the valve body 404 and cover 406). The armature 430 may be movable between a first position and a second position to maintain a valve seal 434 in a closed configuration (as shown in FIG. 7) or an open configuration (not explicitly shown) relative to a valve seat 438, as desired. In some cases, the valve seal 434 may be coupled to or extend through an opening in the armature 430.

A valve spring 440, or other biasing mechanism, may extend between the valve seal 434 and the valve housing 436. The valve housing 436 may be positioned within the valve 402 and may be situated between the cover 406 and the armature 430. The valve housing 436 may include a recess or cavity 442 configured to receive the valve spring 440 and, optionally, a portion of the valve seal 434. The valve spring 440 may bias the valve seal 434 towards the closed configuration. An armature spring 444 is positioned between the cover 406 and the armature 430. The armature spring 444 may be configured to bias the armature 430 towards the armature stops 432 such that the valve seal 434 is biased towards the closed configuration. The valve spring 440, armature spring 444, and/or main valve springs (see, for example, FIG. 5) may have a height and force which may be adjustable thus allowing the pick current to be adjustable. When the armature 430 is in the closed configuration, the valve seal 434 may contact a valve seat 438 of the valve body 404 and prevent a flow of gas therethrough.

In some embodiments, the valve seat 438 may be adjustable. This may allow the valve opening to be adjusted independently of the armature travel. Alternately, the cavity 442 of the valve housing 436 could be adjustable and the valve seat 438 fixed. However, this may require the height of the pole pieces 416 to be adjustable as well.

The pole pieces 416 may be made or fitted with a flared base 446a, 446b (collectively, 446) with flat, angled, or proportional air gap geometry. The portion of the armature 430 that mates with the pole pieces 416 may be constructed with the corresponding type of geometry. This may allow the air gap 448a, 448b cross section to be sized and shaped independent of the pole piece 416 cross section which allows the magnetic force magnitude and profile to be adjusted for a given coil current and air gap.

As an electrical current is passed through the conductive wire 412 (provided via the interconnect pin), a magnetic field is generated and collected by the magnetic flux concentration member 414. A magnetic attraction between the armature 430 and the magnetic flux concentration member 414 may be used to move the armature 430 from the normally closed configuration illustrated in FIG. 7 to an open configuration (not explicitly shown). In the example shown, a top side of the armature 430 may be attracted to and come into contact with the magnetic flux concentration member 414. This magnetic attraction may cause the armature 430 to overcome the biasing force of the valve spring 440 and/or the armature spring 444 and move such that the valve seal 434 is lifted upward and away from a valve seat 438, allowing a flow of gas to pass by the valve seat 438 of the valve body 404. While the electronic valve actuator 400 is described as lifting or raising the valve seal 434, it is contemplated that the electronic valve actuator 400 may be structured to push a shaft-mounted servo-valve in a manner similar to a manual pilot assembly. For example, electronic valve actuator 400 may include a spring loaded seal and shaft that extends through the top of the cover 406 and is sealed by the diaphragm similar to a manual pilot shaft assembly. An external force may be used to actuate the valve actuator 400. The external force may be produced by an actuator, such as a solenoid, mounted external to the valve body 404.

The valve seal 434 and/or valve seat 438 do not necessarily need to be in the center of the armature 430, as shown. The valve seal 434 and/or valve seat 438 could be located off-center relative to the armature 430. In other embodiments, the armature 430 may extend past the pole pieces 416 and the valve seal 434 may be located in that extension. Although not explicitly shown, rather than having the armature 430 lift at both ends evenly across the two air gaps 448, the armature 430 could be hinged at or near one pole piece 416a, 416b and pivot to close the air gap 448a, 448b at the other. In yet another embodiment, the pole pieces 416 and the armature 430 could be designed so that the air gaps 448 are uneven causing one air gap 448a, 448b to close before the other. This may cause the valve seal 434 to tilt to open as it comes off the seat 438 which may result in a slower rise rate of the gas flow as the valve 434 opens which may be advantageous for some burner lighting situations. It is further contemplated that the pole pieces 416 may be used as mounting and locating features for a cover (not explicitly shown) that may be installed over the assembly 400. For example, the pole pieces 416 may extend above the frame top 418 and mate with features in the cover.

While not explicitly shown, a control knob, which may be used to turn a potentiometer and/or to press a manual pilot shaft, may be partially located within the cover 406. Alternatively, or additionally, to the potentiometer, other devices that could sense the rotation or other movement of the control knob may also be used, including, but not limited to, an encoder. A shaft of the control know may extend through cover 406 and into a potentiometer mounted on the circuit board 408. Alternatively, in intermittent pilot applications or applications with energy storage, the control knob and a small circuit board containing the potentiometer and a connector could be mounted to the control cover to allow flexibility in the control knob location and design. For applications with energy storage and either manual or electronic pilot ignition, the knob may activate a momentary switch when pressed which would energize the pilot-side solenoid for the purpose of lighting the pilot.

Figure 8:
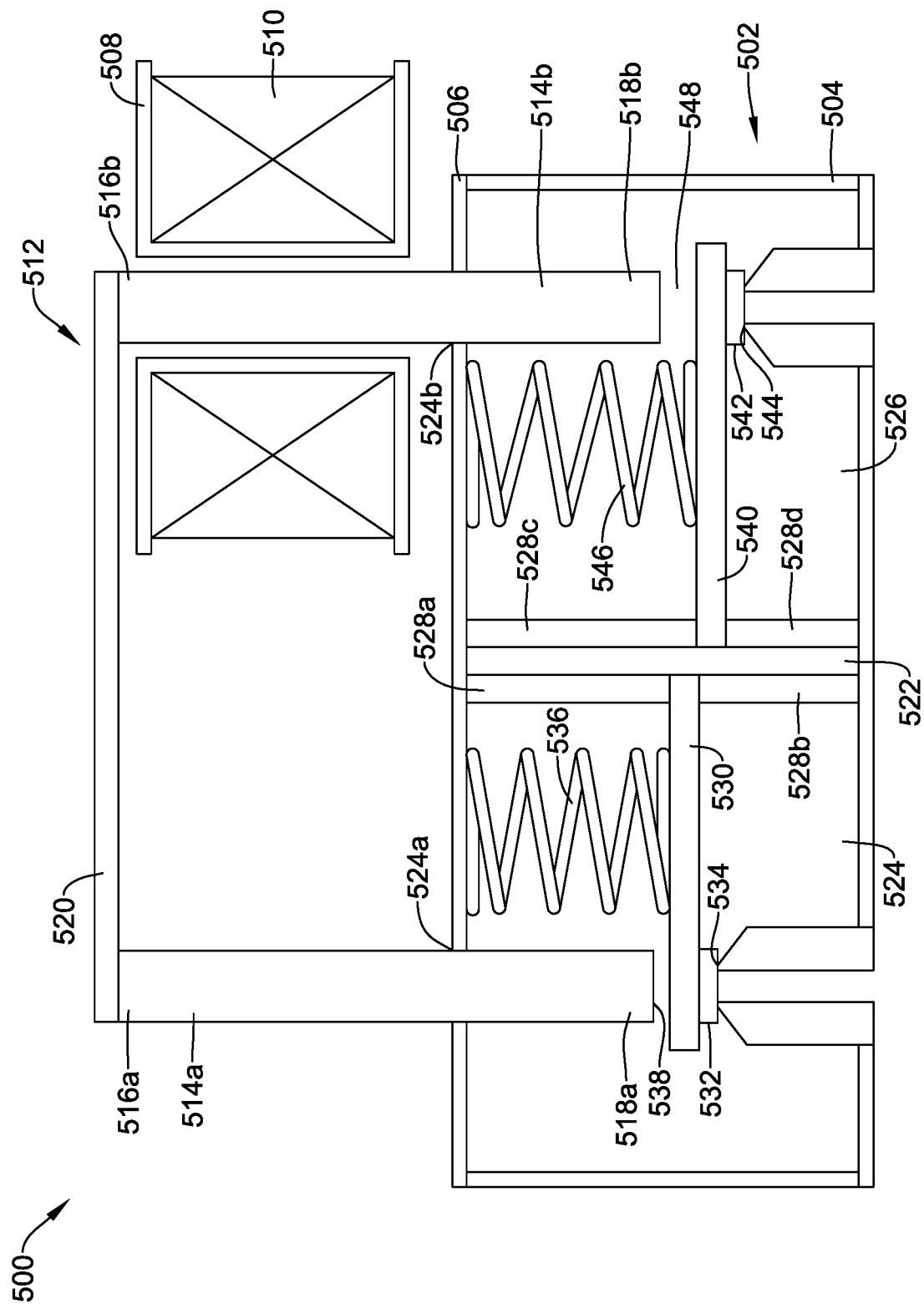
FIG. 8 is a schematic partial cross-sectional view of another illustrative servo valve in an off position.

FIG. 8 is a schematic partial cross-sectional view of another illustrative electronic valve actuator or servo valve 500 in a closed configuration and configured to be mounted to a gas valve 502 such that electronic valve actuator 500 is at least partially fluidly isolated from the gas flow. The gas valve 502 may include a gas valve body 504 and a cover 506, as will be described in more detail herein. For brevity, FIG. 8 illustrates only a portion of the gas valve 502 where the electronic valve actuator 500 engages one or more valve seats. It should be understood that the gas valve 502 may include similar features to the gas valve 200 described above. For example, the electronic valve actuator 500 described herein may be used in place of both of the electronic valve actuators 210, 212 described above.

Some gas valves need to be double blocking (redundant). As such some valve constructions are essentially two valves (e.g., valves 228, 230 in FIG. 5) with the gas path in series. This generally requires two separate electronic valve actuators. There are some electronic valve actuators that actuate both valves with one coil but both valves are opened when the coil is energized (e.g., substantially simultaneously). This may be useful for direct ignition applications. However, for applications that use a pilot burner for ignition, it may be beneficial to be able to actuate both valves independently so the first valve can be opened to establish the pilot burner and then the second valve can be opened at a later time to light the main burner. The electronic valve actuator 500 illustrated in FIG. 8 may actuate at least two valves individually with a single electronic valve actuator.

In addition to fluidly isolating a least a portion of the electronic valve actuator 500 from the gas flow to reduce or prevent corrosion of the various components thereof, it is contemplated that locating all or a substantial portion of the electronic valve actuator 500 exterior to a valve body 504 may also increase flexibility in the design of the electronic valve actuator 500 as there are fewer constraints on the design. In some cases, a lower cost magnetic material may be utilized.

The electronic valve actuator 500 may be electronically coupled to a controller and/or power source. In some cases, the electronic valve actuator 500 may be coupled directly to a circuit board (not explicitly shown) via one or more components thereof. This may allow for a more secure and potentially stronger mounting option compared to mounting the circuit board inside of a control unit cover which is then mounted to a bracket assembly. In some embodiments, the circuit board may be mounted to the valve body 504 and/or the removable cover 506.

In some cases, and as shown in FIG. 8, the electronic valve actuator or servo valve 500 may be situated such that it is substantially fluidly isolated from the gas flow stream. As the quality of fuel gas decreases, gas supplies may include increasing concentrations of hydrogen sulfide. Some components within the electronic valve actuator 500 (such as, but not limited to copper components) may be highly susceptible to corrosion from hydrogen sulfide gas, which reacts with copper to form copper sulfide, especially in the presence of moisture. Fluidly isolating these components from the gas stream may reduce the susceptibility of the electronic valve actuator 500 to such corrosion.

The illustrative electronic valve actuator 500 includes a non-conductive support member or bobbin 508. The support bobbin 508 may be mechanically coupled to the circuit board via one or more connection posts (not explicitly show). A conductive wire 510 may be wound around at least a portion of the support bobbin 508 to form a magnetic coil. A first end portion (not explicitly shown) of the conductive wire 510 may be electrically coupled to an interconnect pin (not explicitly shown), and a second end portion (not explicitly shown) of the conductive wire 510 may be electrically coupled with a ground terminal (not explicitly shown). In some instances, the conductive wire 510 may be an insulated copper wire. However, other conductive materials, such as, but not limited to, nickel or aluminum, may be used to form the conductive wire 510, as desired. The conductive wire 510 may have a length which is wound about the support bobbin 508. The length may be selected to generate a predetermined magnetic field when current flows through the conductive wire 510. The interconnect terminal may be electrically coupled to the circuit board, sometimes using a non-copper wire (such as, but not limited to, a nickel wire). Additionally, or alternatively, the interconnect pin may be configured to be electrically connected to a power source, controller, or other mechanism in place of or in addition to the circuit board for selectively supplying current to the conductive wire to control the open/close position of the valve actuator 500.

The illustrative electronic valve actuator 500 may further include a magnetic flux concentration member 512. The magnetic flux concentration member 512 may be, for example, a soft ferromagnetic material, such as iron. The magnetic flux concentration member may have a generally "U" shaped configuration including a pair of laterally spaced parallel legs or pole pieces 514*a*, 514*b* (collectively, 514) and an interconnecting flux bar 520 extending between a first end region 516*a*, 516*b* (collectively, 516) of each pole piece 514. The pole pieces 514 may extend from the first end region 516 to a second end region 518*a*, 518*b* (collectively, 518). The first end region 516 may be positioned exterior to the valve body 304 and the cover 306 while the second end region 518 may be positioned within and enclosed by the valve body 504 and cover 506. It is contemplated that the conductive wire 510 may be wound about any one of the pole pieces 514*a*, 514*b* or interconnecting flux bar 520, as desired.

As described above, the valve body 504 may include a removable cover 506. The removable cover 506 may be releaseably secured to the valve body 304 by one or more fastening mechanisms, such as, but not limited to, screws, bolts, etc. The cover 506 may include one or more openings 524*a*, 524*b* (collectively, 524) sized and shaped to allow the pole pieces 514 of the magnetic flux concentration member to pass through the cover 506. The openings 524 may include sealing features configured to provide a fluid tight seal around the outer surface of the legs 514. In some embodiments, the sealing feature may include a deformable o-ring (not explicitly shown) configured to conform to an outer surface of the legs. This is just an example. Other suitable sealing mechanisms may be used as desired. However, the pole pieces 514 are not required to extend through the cover 506. In some cases, the pole pieces 514 could be similar to the pole pieces 416 shown in FIG. 7 or the pole pieces 616 shown in FIG. 9.

The removable cover 506 may be formed such that the magnetic flux path of the magnetic flux concentration member is not shorted during operation. For example, the removable cover 506 may be formed from a non-magnetic material. Alternatively, the removable cover 506 may be formed from a magnetic material with a non-magnetic material region surrounding the openings 524. In such an instances, the non-magnetic material region may have a diameter selected to prevent shorting of the magnetic flux path.

The valve body 504 includes casting wall 522 which separates a first gas supply cavity 524 (configured to provide a flow of gas to a pilot light and/or a first flow chamber via a first gas valve) and a second gas supply cavity 526 (configured to provide a flow of gas a to a burner via a second gas valve). The wall 522 may include one or more magnetic plates 528*a*, 528*b*, 528*c*, 528*d* (collectively, 528) positioned on either side of the wall 522. A magnetically non-conductive wall 522 may be a magnetic air gap that must be bridged by the magnetic field. Thus, it may be desirable to size the one or more magnetic plates 528 as large as possible to reduce the magnetic reluctance across this air gap. It is contemplated that the wall 522, or a portion of the wall 522, between the supply cavities 524, 526 may be made of a magnetic material instead of a non-magnetic material (e.g., aluminum casting). However, this may require either the entire body 504 to be magnetic or a seal between the wall 522 and the rest of the casting to prevent leakage between the supply cavities 524, 526.

A first armature 530 may be positioned between the second end region 518 of the first pole piece 514a and a first valve seat 534. The armature 530 may be fully enclosed within the valve 502 (e.g., within an interior defined by the valve body 504 and cover 506). The armature 530 may be movable between a first position and a second position to maintain a first valve seal 532 in a closed configuration (as shown in FIG. 8) or an open configuration (not explicitly shown) relative to the valve seat 534, as desired. In some cases, the valve seal 532 may be coupled to a surface of the armature 530 adjacent to the first valve seat 534.

A first armature spring 536, or other biasing mechanism, may extend between the first armature 530 and the removable cover 506. The first armature spring 536 may be configured to bias the armature 530 towards the valve seat 534 such that the valve seal 532 is biased towards the closed configuration. The armature spring 536 and/or main valve springs (see, for example, FIG. 5) may have a height and force which may be adjustable thus allowing the pick current to be adjustable. When the first armature 530 is in the closed configuration, the valve seal 532 may contact a valve seat 534 of the valve body 504 and prevent a flow of gas therethrough.

A second armature 540 may be positioned between the second end region 518 of the second pole piece 514b and a second valve seat 544. The second armature 540 may be fully enclosed within the valve 502 (e.g., within an interior defined by the valve body 504 and cover 506). The second armature 540 may be movable between a first position and a second position to maintain a second valve seal 542 in a closed configuration (as shown in FIG. 8) or an open configuration (not explicitly shown) relative to the second valve seat 544, as desired. In some cases, the second valve seal 542 may be coupled to a surface of the second armature 540 adjacent to the second valve seat 544.

A second armature spring 546, or other biasing mechanism, may extend between the second armature 540 and the removable cover 506. The second armature spring 546 may be configured to bias the armature 540 towards the second valve seat 544 such that the second valve seal 542 is biased towards the closed configuration. The second armature spring 546 and/or main valve springs (see, for example, FIG. 5) may have a height and force which may be adjustable thus allowing the pick current to be adjustable. When the second armature 540 is in the closed configuration, the second valve seal 542 may contact a second valve seat 544 of the valve body 504 and prevent a flow of gas therethrough.

As an electrical current is passed through the conductive wire 510 (provided via the interconnect pin), a magnetic field is generated and collected by the magnetic flux concentration member 512. A magnetic attraction between the first armature 530 and the pole piece 514a may be used to move the armature 530 from the normally closed configuration illustrated in FIG. 8 to an open configuration (not explicitly shown). In the example shown, a top side of the first armature 530 may be attracted to and come into contact with the pole piece 514a. This magnetic attraction may cause the armature 530 to overcome the biasing force of the valve spring 536 and/or the armature spring (not explicitly shown) and move such that the valve seal 532 is lifted upward and away from a valve seat 534, allowing a flow of gas to pass by the valve seat 534 of the valve body 504.

While the electronic valve actuator 500 is described as lifting or raising the valve seal 532, it is contemplated that the electronic valve actuator 500 may be structured to push a shaft-mounted servo-valve in a manner similar to a manual pilot assembly. For example, electronic valve actuator 500 may include a spring loaded seal and shaft that extends through the top of the cover 506 and is sealed by the diaphragm similar to a manual pilot shaft assembly. An external force may be used to actuate the valve actuator 500. The external force may be produced by an actuator, such as a solenoid, mounted external to the valve body 504.

It is contemplated that the first and second armatures 530, 540 may actuate in response to specific, different pick currents. For example, the electronic valve actuator 500 may be configured such that at the first armature 530 will pick at a first specified current thus opening the first valve seal 532 (and the first main valve) while the second armature 540 remains in the closed configuration. Once the first armature 530 has been actuated the electronic valve actuator 500 may be held at that level until the second main valve (or second valve seal 542) needs to be opened (e.g., picked). Picking the first main valve may cause the magnetic reluctance of the circuit to decrease and the current required to pick the second main valve to decrease compared to when both valves are open. The second armature 540 may be structured such that the second valve would pick only when the current was increased to a higher level. To accomplish this, generally the first armature 530 may be configured with a smaller air gap 538 and smaller spring 536 force than the air gap 548 of the second armature 540 and the second armature spring 546. However, this is not required. It is contemplated that there exists an infinite combination of air gaps and spring forces that may allow the first and second armatures 530, 540 to actuate independently and sequentially. For example, the air gaps could be equal if the force of the second armature spring 546 was sufficiently higher than the force of the first armature spring 536. This is just one example. To operate the second armature 540 once the first armature 530 has been picked, the coil current would be further increased until the second armature 540 picks. The current could be held at this level, or optionally to increase efficiency, the current could be reduced to some value above the drop current to hold the valves 534, 544 open.

Although FIG. 8 illustrates the conductive wire 510 as wound such that the axis oriented vertically, the coil axis could also be oriented horizontally and positioned around the frame top 520. It is further contemplated that the electronic valve actuator 500 may use two coils with one around each pole piece 514a, 514b. This may reduce the amount of conductive wire 510 needed to achieve the same magnetic force, reduce the height of the coils 510 and pole pieces 514 above the circuit board (not explicitly shown), as well as increase the overall magnetic efficiency. Similarly, if space allowed, a third coil could be added to the frame top 520 further increasing the magnetic efficiency. In the example of two coils mounted on the pole pieces 514, the coils may have two separate bobbins 508 or could be wound on one bobbin as a coil module. The use of one bobbin may allow for the use of one continuous piece of conductive wire 510 and avoid having additional connectors for each coil.

If the geometry of the valve 502 permitted, three or more pole pieces 514 may be used. For example, the pole pieces 514 may be arranged in a non-linear and symmetric pattern such as an equilateral triangle, square, etc. This would enable the use of two or more coils, one per pole piece, resulting in higher magnetic efficiency as the number of pole pieces is increased. These coils could be located on one or multiple bobbins. Further, the total cross sectional area of the pole pieces may remain the same as a design with the same magnetic force and fewer pole pieces. This would provide an even further increase in magnetic efficiency. It is contemplated that the electronic valve actuator may have six or more pole pieces 514. In an embodiment with six or more pole pieces, every other pole piece could be a different air gap from its adjacent pole piece for the purpose of controlling the drop out current.

While not explicitly shown, a control knob, which may be used to turn a potentiometer and/or to press a manual pilot shaft, may be partially located within the cover 506. Alternatively, or additionally, to the potentiometer, other devices that could sense the rotation or other movement of the control knob may also be used, including, but not limited to, an encoder. A shaft of the control know may extend through cover 506 and into a potentiometer mounted on the circuit board. Alternatively, in intermittent pilot applications or applications with energy storage, the control knob and a small circuit board containing the potentiometer and a connector could be mounted to the control cover to allow flexibility in the control knob location and design. For applications with energy storage and either manual or electronic pilot ignition, the knob may activate a momentary switch when pressed which would energize the pilot-side solenoid for the purpose of lighting the pilot.

Figure 9:
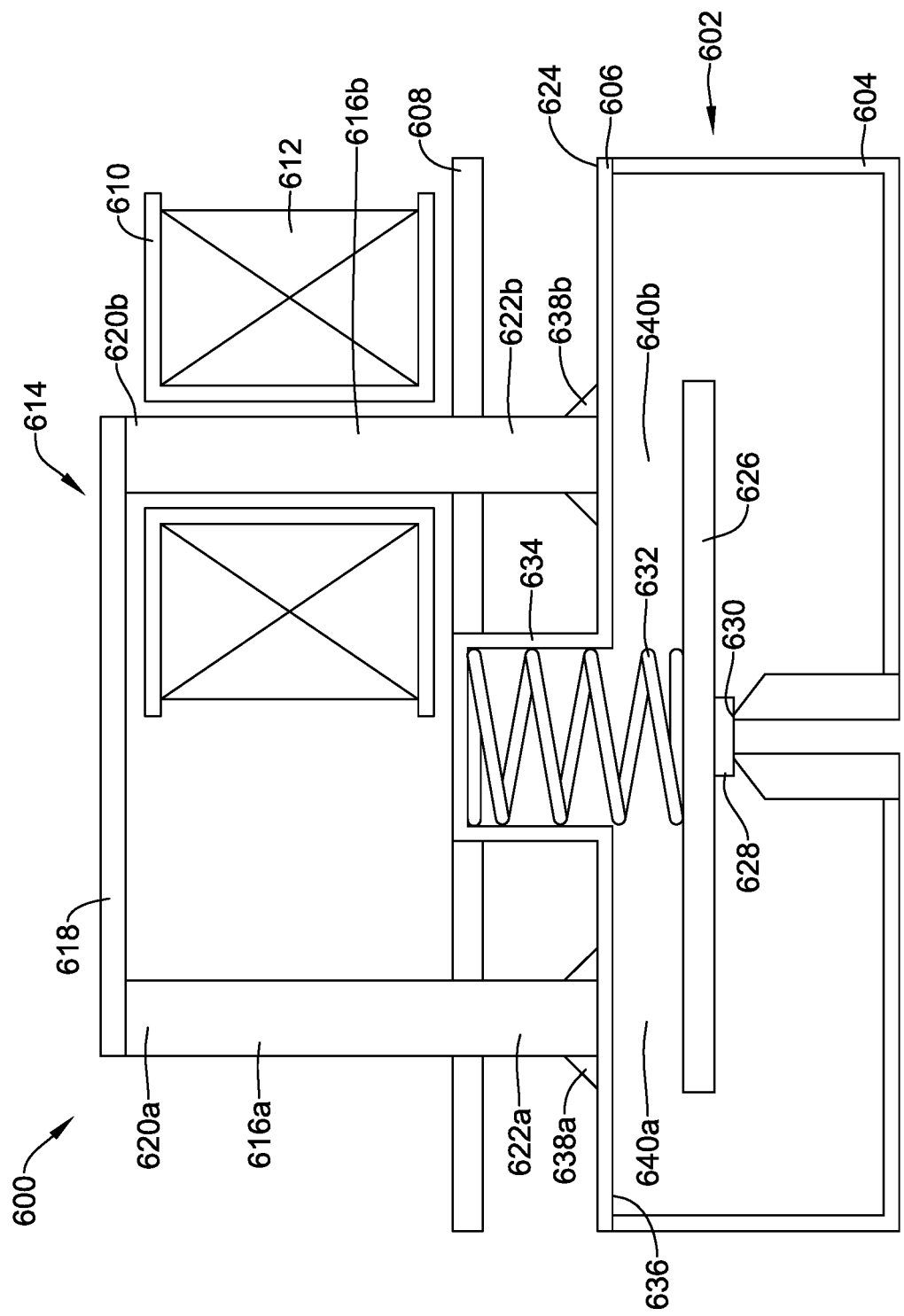
FIG. 9 is a schematic partial cross-sectional view of another illustrative servo valve in an off position.

FIG. 9 is a schematic partial cross-sectional view of another illustrative electronic valve actuator or servo valve 600 in a closed configuration and configured to be mounted to a gas valve 602 such that electronic valve actuator 600 is at least partially fluidly isolated from the gas flow. The gas valve 602 may include a gas valve body 604 and a cover 606, as will be described in more detail herein. For brevity FIG. 9 illustrates only a portion of the gas valve 602 where the electronic valve actuator 600 engages a valve seat. It should be understood that the gas valve 602 may include similar features to the gas valve 200 described above. For example, the electronic valve actuator 600 described herein may be used in place of either or both of the electronic valve actuators 210, 212 described above.

In addition to fluidly isolating a least a portion of the electronic valve actuator 600 from the gas flow to reduce or prevent corrosion of the various components thereof, it is contemplated that locating all or a substantial portion of the electronic valve actuator 600 exterior to a valve body 604 may also increase flexibility in the design of the electronic valve actuator 600 as there are fewer constraints on the design. In some cases, a lower cost magnetic material may be utilized.

The electronic valve actuator 600 may be electronically coupled to a controller and/or power source. In some cases, the electronic valve actuator 600 may be coupled directly to a circuit board 608. This may allow for a more secure and potentially stronger mounting option compared to mounting the circuit board 608 inside of a control unit cover which is then mounted to a bracket assembly. In other embodiments, the circuit board 608 may be mounted to the valve body 604 and/or the removable cover 606.

In some cases, and as shown in FIG. 9, the electronic valve actuator or servo valve 600 may be situated such that it is substantially fluidly isolated from the gas flow stream. As the quality of fuel gas decreases, gas supplies may include increasing concentrations of hydrogen sulfide. Some components within the electronic valve actuator 600 (such as, but not limited to copper components) may be highly susceptible to corrosion from hydrogen sulfide gas, which reacts with copper to form copper sulfide, especially in the presence of moisture. Fluidly isolating these components from the gas stream may reduce the susceptibility of the electronic valve actuator 600 to such corrosion.

The illustrative electronic valve actuator 600 includes a non-conductive support member or bobbin 610. The support bobbin 610 may be mechanically coupled to the circuit board 608 via one or more connection posts (not explicitly show). A conductive wire 612 may be wound around at least a portion of the support bobbin 610 to form a magnetic coil. A first end portion (not explicitly shown) of the conductive wire 612 may be electrically coupled to an interconnect pin (not explicitly shown), and a second end portion (not explicitly shown) of the conductive wire 612 may be electrically coupled with a ground terminal (not explicitly shown). In some instances, the conductive wire 612 may be an insulated copper wire. However, other conductive materials, such as, but not limited to, nickel or aluminum, may be used to form the conductive wire 612, as desired. The conductive wire 612 may have a length which is wound about the support bobbin 610. The length may be selected to generate a predetermined magnetic field when current flows through the conductive wire 612. The interconnect terminal may be electrically coupled to the circuit board 608, sometimes using a non-copper wire (such as, but not limited to, a nickel wire). Additionally, or alternatively, the interconnect pin may be configured to be electrically connected to a power source, controller, or other mechanism in place of or in addition to the circuit board 608 for selectively supplying current to the conductive wire to control the open/close position of the valve actuator 600.

The illustrative electronic valve actuator 600 may further include a magnetic flux concentration member 614. The magnetic flux concentration member 614 may be, for example, a soft ferromagnetic material, such as iron. The magnetic flux concentration member may have a generally "U" shaped configuration including a pair of laterally spaced parallel legs or pole pieces 616a, 616b (collectively, 616) and an interconnecting frame 618 extending between a first end region 620a, 620b (collectively, 620) of each pole piece 616. The pole pieces 616 may extend from the first end region 620 to a second end region 622a, 622b (collectively, 622). The first end region 620 may be spaced a distance from the valve body 604 and the cover 606 while the second end region 622 may be positioned against or in contact with an outer surface of the cover 606.

The removable cover 606 may be releaseably secured to the valve body 604 by one or more fastening mechanisms, such as, but not limited to, screws, bolts, etc. The removable cover 606 may be formed such that the magnetic flux path of the magnetic flux concentration member is not shorted during operation. For example, the removable cover 606 may be formed from a non-magnetic material. Alternatively, the removable cover 606 may be formed from a magnetic material with a non-magnetic material region surrounding the region adjacent to the second end regions 622 of the pole pieces 616. In such an instances, the non-magnetic material region may have a diameter selected to prevent shorting of the magnetic flux path.

In some cases, an armature 626 may be positioned between an interior surface 636 of the cover 606 and a valve seat 630. The armature 626 may be fully enclosed within the valve 602 (e.g., within an interior defined by the valve body 604 and cover 606). The armature 626 may be movable between a first position and a second position to maintain a valve seal 628 in a closed configuration (see, for example, FIG. 9) or an open configuration relative to a valve seat 630, as desired. In some cases, the valve seal 628 may be coupled to a surface of the armature 626 adjacent to the valve seat 630.

An armature spring 632 is positioned between the cover 606 and the armature 626. In some embodiments, the cover 606 may include a raised regions 634 adjacent to armature spring 632. At least a portion of the armature spring 632 may be received within the raised region. The armature spring 632 may be configured to bias the armature 626 towards valve seat 630 such that the valve seal 628 is biased towards the closed configuration. The armature spring 632 and/or main valve springs (see, for example, FIG. 5) may have a height and force which may be adjustable thus allowing the pick current to be adjustable. When the armature 626 is in the closed configuration, the valve seal 628 may contact a valve seat 630 of the valve body 604 and prevent a flow of gas therethrough. While not explicitly shown, it is contemplated that the electronic valve actuator 600 may be modified to control a second valve seal and seat with a single coil in a manner similar to that described with respect to FIG. 8.

The pole pieces 616 may be made or fitted with a flared base 638a, 638b (collectively, 638) with flat, angled, or proportional air gap geometry. The magnetic air gap may include the cover 606 and use the cover to create the minimum air gap. Together with the pole piece flare 638, which allows the air gap reluctance to be changed independent of the cover 606 thickness, and the force of the armature spring 632, the pick and drop currents can be set. The pick current may be adjustable changing the air gap by adjusting the valve seat 630 height.

As an electrical current is passed through the conductive wire 612 (provided via the interconnect pin), a magnetic field is generated and collected by the magnetic flux concentration member 614. A magnetic attraction between the armature 626 and the magnetic flux concentration member 614 may be used to move the armature 626 from the normally closed configuration illustrated in FIG. 9 to an open configuration (not explicitly shown). In the example shown, a top side of the armature 626 may be attracted to the magnetic flux concentration member 614 and come into contact with the interior surface 636 of the cover 606. This magnetic attraction may cause the armature 626 to overcome the biasing force of the valve spring 632 and/or the armature spring 632 and move such that the valve seal 628 is lifted upward and away from a valve seat 630, allowing a flow of gas to pass by the valve seat 630 of the valve body 604. While the electronic valve actuator 600 is described as lifting or raising the valve seal 628, it is contemplated that the electronic valve actuator 600 may be structured to push a shaft-mounted servo-valve in a manner similar to a manual pilot assembly. For example, electronic valve actuator 600 may include a spring loaded seal and shaft that extends through the top of the cover 606 and is sealed by the diaphragm similar to a manual pilot shaft assembly. An external force may be used to actuate the valve actuator 600. The external force may be produced by an actuator, such as a solenoid, mounted external to the valve body 604.

The valve seal 628 and/or valve seat 630 do not necessarily need to be in the center of the armature 626, as shown. The valve seal 628 and/or valve seat 630 could be located off-center relative to the armature 626. In other embodiments, the armature 626 may extend past the pole pieces 616 and the valve seal 628 may be located in that extension. Although not explicitly shown, rather than having the armature 626 lift at both ends evenly across the two air gaps 640, the armature 626 could be hinged at or near one pole piece 616a, 616b and pivot to close the air gap 640a, 640b at the other. In yet another embodiment, the pole pieces 616 and the armature 626 could be designed so that the air gaps 640 are uneven causing one air gap 640a, 640b to close before the other. This may cause the valve seal 628 to tilt to open as it comes off the seat 630 which may result in a slower rise rate of the gas flow as the valve 628 opens which may be advantageous for some burner lighting situations. It is further contemplated that the pole pieces 616 may be used as mounting and locating features for a cover (not explicitly shown) that may be installed over the assembly 600. For example, the pole pieces 616 may extend above the frame top 618 and mate with features in the cover.

Although FIG. 9 illustrates the conductive wire 612 as wound such that the axis oriented vertically, the coil axis could also be oriented horizontally and positioned around the frame top 618. It is further contemplated that the electronic valve actuator 600 may use two coils with one around each pole piece 616a, 616b. This may reduce the amount of conductive wire 612 needed to achieve the same magnetic force, reduce the height of the coils 612 and pole pieces 616 above the circuit board (not explicitly shown), as well as increase the overall magnetic efficiency. Similarly, if space allowed, a third coil could be added to the frame top 618 further increasing the magnetic efficiency. In the example of two coils mounted on the pole pieces 616, the coils may have two separate bobbins 610 or could be wound on one bobbin as a coil module. The use of one bobbin may allow for the use of one continuous piece of conductive wire 612 and avoid having additional connectors for each coil.

If the geometry of the valve 602 permitted, three or more pole pieces 616 may be used. For example, the pole pieces 616 may be arranged in a non-linear and symmetric pattern such as an equilateral triangle, square, etc. This would enable the use of two or more coils, one per pole piece, resulting in higher magnetic efficiency as the number of pole pieces is increased. These coils could be located on one or multiple bobbins. Further, the total cross sectional area of the pole pieces may remain the same as a design with the same magnetic force and fewer pole pieces. This would provide an even further increase in magnetic efficiency. It is contemplated that the electronic valve actuator may have six or more pole pieces 616. In an embodiment with six or more pole pieces, every other pole piece could be a different air gap from its adjacent pole piece for the purpose of controlling the drop out current.

While not explicitly shown, a control knob, which may be used to turn a potentiometer and/or to press a manual pilot shaft, may be partially located within the cover 606. Alternatively, or additionally, to the potentiometer, other devices that could sense the rotation or other movement of the control knob may also be used, including, but not limited to, an encoder. A shaft of the control know may extend through cover 606 and into a potentiometer mounted on the circuit board 608. Alternatively, in intermittent pilot applications or applications with energy storage, the control knob and a small circuit board containing the potentiometer and a connector could be mounted to the control cover to allow flexibility in the control knob location and design. For applications with energy storage and either manual or electronic pilot ignition, the knob may activate a momentary switch when pressed which would energize the pilot-side solenoid for the purpose of lighting the pilot.

The disclosure should not be considered limited to the particular examples described above, but rather should be understood to cover all aspects of the disclosure as set out in the attached claims. Various modifications, equivalent processes, as well as numerous structures to which the disclosure can be applicable will be readily apparent to those of skill in the art upon review of the instant specification.

What is claimed is:

1. A gas valve comprising:
    a gas valve body having an inlet port and an outlet port;
    a valve and a valve seat both housed by the gas valve body, the valve being movable between a closed position where the valve is positioned against the valve seat and an open position where the valve is spaced away from the valve seat;
    an armature housed by the gas valve body, wherein the valve is movable with the armature;
    a pole situated outside of the gas valve body so as to not be exposed to gas in the gas valve body, wherein the pole is positioned to be in magnetic communication with at least part of the armature through the gas valve body;
    a coil situated outside the gas valve body so as to not be exposed to gas in the gas valve body, wherein the coil is wound about the pole such that activation of the coil produces a magnetic flux that is carried to an end of the pole, through the gas valve body, and to the armature, resulting in movement of the armature, and movement of the valve between the open position and the closed position; and
    a printed circuit board situated outside of the gas valve body but secured relative to the gas valve body, wherein the printed circuit board carries the coil.

2. The gas valve of claim 1, wherein the pole comprises a first leg, a second leg and a third leg, wherein the third leg connects the first leg and the second leg, and wherein the coil is wound about the first leg.

3. The gas valve of claim 2, wherein the first leg has a first end adjacent an outer surface of the gas valve body, and at least part of the armature is positioned inside of the gas valve body and in registration with the first end of the first leg.

4. The gas valve of claim 3, wherein the first end of the first leg is flared out.

5. The gas valve of claim 1, wherein the valve is biased toward the closed position, and wherein activation of the coil results in movement of the valve from the closed position to the open position.

6. The gas valve of claim 1, wherein the valve and the armature are formed as a single piece.

7. The gas valve of claim 1, wherein the valve comprises a non-magnetic material and the armature comprises a magnetic material.

8. The gas valve of claim 1, wherein the gas valve body, at least between the pole and the armature, comprises a non-magnetic material.

9. The gas valve of claim 1, wherein the valve is configured to move with the armature towards the closed position until the valve engages the valve seat, at which time the armature continues to move by an over-travel amount.

10. The gas valve of claim 1, wherein the printed circuit board includes a hole that accepts therein at least part of the pole.

11. The gas valve of claim 1, wherein the gas valve body comprises a projection that extends outwardly and defines a cavity inside gas valve body that accommodates at least part of a spring that biases the valve toward the closed position.

12. A gas valve assembly, comprising:
    a gas valve body having an inlet port and an outlet port, with a fluid path extending between the inlet port and the outlet port;
    a valve seat situated in the fluid path between the inlet port and the outlet port;
    a diaphragm valve configured to be responsive to one or more pneumatic pressures to move between a normally closed position where the first diaphragm valve is sealed against the valve seat and an open position wherein the first diaphragm valve is pulled away from the valve seat;
    a servo valve that, when activated, controls the one or more pneumatic pressures to move the first diaphragm valve away from the valve seat and to allow a flow of gas between the inlet port and the outlet port;
    the servo valve including:
        a servo valve and a servo valve seat both situated within an interior of the gas valve body, wherein the servo valve is movable between a closed position where the servo valve is positioned against the servo valve seat and an open position where the servo valve is spaced away from the servo valve seat; and
        a pole and a coil both situated outside of the gas valve body so as to not be exposed to gas in the gas valve body, wherein the coil is wound about the pole such that activation of the coil produces a magnetic flux in the pole that magnetically moves the servo valve in the gas valve body between the open position and the closed position.

13. The gas valve assembly of claim 12, further comprising a printed circuit board situated adjacent to an outer surface of the gas valve body.

14. The gas valve assembly of claim 13, wherein the coil of the servo valve is electrically coupled to the printed circuit board via a coil pin.

15. The gas valve assembly of claim 12, wherein the pole comprises a first leg, a second leg and a third leg, wherein the third leg connects the first leg and the second leg, and wherein the coil is wound about the first leg.

16. The gas valve assembly of claim 12, wherein the servo valve comprises an armature, wherein at least part of the armature is situated in registration with the pole with the gas valve body between the armature and the pole.

17. A gas valve assembly, comprising:
    a gas valve body having an inlet port and an outlet port, with a fluid path extending between the inlet port and the outlet port, the gas valve body including a non-magnetic cover;
    a valve seat situated in the fluid path between the inlet port and the outlet port;
    a diaphragm valve configured to be responsive to one or more pneumatic pressures to move between a normally closed position where the first diaphragm valve is sealed against the valve seat and an open position wherein the first diaphragm valve is pulled away from the valve seat;
    a servo valve that, when activated, controls the one or more pneumatic pressures to move the first diaphragm valve away from the valve seat and to allow a flow of gas between the inlet port and the outlet port;
    the servo valve including:
        a servo valve and a servo valve seat both situated within an interior of the gas valve body, wherein the servo valve is movable between a closed position where the servo valve is positioned against the servo valve seat and an open position where the servo valve is spaced away from the servo valve seat; and
        a pole and a coil both situated outside of the gas valve body so as to not be exposed to gas in the gas valve body, wherein the coil is wound about the pole such that activation of the coil produces a magnetic flux in the pole that applies a magnetic driving force to the servo valve in the gas valve body to drive the servo valve between the open position and the closed position.

18. The gas valve assembly of claim 17, wherein the servo valve comprises an armature, wherein at least part of the armature is situated in registration with the pole with the gas valve body between the armature and the pole.

19. The gas valve assembly of claim 18, further comprising a biasing element positioned between the gas valve body and the armature, the biasing element configured to bias the servo valve towards a closed position.

20. The gas valve assembly of claim 17, wherein the pole comprises a first leg, a second leg and a third leg, wherein the third leg connects the first leg and the second leg, and wherein the coil is wound about the first leg.

* * * * *